(12) United States Patent
Cappetta et al.

(10) Patent No.: US 12,106,201 B2
(45) Date of Patent: Oct. 1, 2024

(54) RECONFIGURABLE HARDWARE BUFFER IN A NEURAL NETWORKS ACCELERATOR FRAMEWORK

(71) Applicant: STMICROELECTRONICS S.r.l., Agrate Brianza (IT)

(72) Inventors: Carmine Cappetta, Battipaglia (IT); Thomas Boesch, Rovio (CH); Giuseppe Desoli, San Fermo Della Battaglia (IT)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 955 days.

(21) Appl. No.: 17/039,653

(22) Filed: Sep. 30, 2020

(65) Prior Publication Data

US 2022/0101086 A1    Mar. 31, 2022

(51) Int. Cl.
*G06N 3/04*  (2023.01)
*G06F 9/38*  (2018.01)
(Continued)

(52) U.S. Cl.
CPC ............. *G06N 3/04* (2013.01); *G06F 9/3806* (2013.01); *G06F 13/1657* (2013.01);
(Continued)

(58) Field of Classification Search
CPC ............. G06T 7/11; G06T 2207/20084; G06F 9/3806
See application file for complete search history.

(56) References Cited

U.S. PATENT DOCUMENTS 7,769,792 B1 * 8/2010 Burrows ................. G06F 16/23
707/638
8,375,188 B1 * 2/2013 Shah .................... G06F 11/2097
714/13

(Continued)

OTHER PUBLICATIONS

"CS23ln Convolutional Neural Networks for Visual Recognition", *Github*, retrieved Aug. 2020, <https://cs23ln.github.io/convolutional-networks/>, 22 pages.

(Continued)

*Primary Examiner* — Henry Tsai
*Assistant Examiner* — Aurangzeb Hassan
(74) *Attorney, Agent, or Firm* — Seed IP Law Group LLP

(57) ABSTRACT

A convolutional accelerator framework (CAF) has a plurality of processing circuits including one or more convolution accelerators, a reconfigurable hardware buffer configurable to store data of a variable number of input data channels, and a stream switch coupled to the plurality of processing circuits. The reconfigurable hardware buffer has a memory and control circuitry. A number of the variable number of input data channels is associated with an execution epoch. The stream switch streams data of the variable number of input data channels between processing circuits of the plurality of processing circuits and the reconfigurable hardware buffer during processing of the execution epoch. The control circuitry of the reconfigurable hardware buffer configures the memory to store data of the variable number of input data channels, the configuring including allocating a portion of the memory to each of the variable number of input data channels.

31 Claims, 21 Drawing Sheets

(51) Int. Cl.
  *G06F 13/16* (2006.01)
  *G06F 13/40* (2006.01)
  *G06N 3/063* (2023.01)
  *G06T 7/11* (2017.01)
(52) U.S. Cl.
  CPC ...... *G06F 13/1673* (2013.01); *G06F 13/4022* (2013.01); *G06N 3/063* (2013.01); *G06T 7/11* (2017.01); *G06T 2207/20084* (2013.01)

(56) References Cited

U.S. PATENT DOCUMENTS

| | | | | |
|---|---|---|---|---|
| 10,733,512 | B1* | 8/2020 | Andoni | G06N 3/086 |
| 11,200,186 | B2* | 12/2021 | Fleming, Jr. | G06F 13/4027 |
| 11,586,601 | B2* | 2/2023 | Xiao | G06N 3/063 |
| 2004/0052135 | A1 | 3/2004 | Le | |
| 2009/0177871 | A1* | 7/2009 | Von Praun | G06F 9/3851 |
| | | | | 712/226 |
| 2014/0282574 | A1* | 9/2014 | Marathe | G06F 9/4881 |
| | | | | 718/103 |
| 2016/0103691 | A1* | 4/2016 | Sethia | G06F 1/329 |
| | | | | 713/100 |
| 2016/0379109 | A1 | 12/2016 | Chung et al. | |
| 2017/0103299 | A1 | 4/2017 | Aydonat et al. | |
| 2018/0032865 | A1* | 2/2018 | Nishimura | G06N 3/08 |
| 2018/0101790 | A1* | 4/2018 | Hack | G06N 20/00 |
| 2018/0189229 | A1 | 7/2018 | Desoli et al. | |
| 2018/0189424 | A1 | 7/2018 | Boesch et al. | |
| 2018/0189641 | A1 | 7/2018 | Boesch et al. | |
| 2018/0189642 | A1* | 7/2018 | Boesch | G06F 30/327 |
| 2018/0247194 | A1 | 8/2018 | Plebani et al. | |
| 2019/0004945 | A1* | 1/2019 | Fleming | G06F 12/0802 |
| 2019/0266479 | A1* | 8/2019 | Singh | G06N 3/08 |
| 2019/0377840 | A1 | 12/2019 | Boesch et al. | |
| 2020/0272779 | A1* | 8/2020 | Boesch | G06F 30/34 |
| 2020/0310884 | A1* | 10/2020 | Villalobos | G06F 16/909 |
| 2020/0364055 | A1* | 11/2020 | Al Sheikh | G06F 9/3848 |
| 2021/0019363 | A1* | 1/2021 | Venkatesh | G06T 3/4023 |
| 2021/0125070 | A1* | 4/2021 | Wang | G06N 3/063 |
| 2021/0256346 | A1* | 8/2021 | Desoli | G06F 18/217 |
| 2022/0166440 | A1* | 5/2022 | Mohta | H03M 1/303 |

OTHER PUBLICATIONS

Ma, et al., "Algorithm-Hardware Co-Design of Single Shot Detector for Fast Object Detection on FPGAs", 2019, 8 pages.

Mirzaeian, et al., "TCD-NPE: A Re-configurable and Efficient Neural Processing Engine, Powered by Novel Temporal-Carry-deferring MACs", 2019, pp. 1-9.

Spagnolo, et al., "Energy-Efficient Architecture for CNNs Inference on Heterogeneous FPGA", *Journal of Low Power Electronics and Applications,* vol. 10(1), 2019, 17 pages.

Yu, et al., "Multi-Scale Context Aggregation by Dilated Convolutions", *ICLR 2016,* 2016, pp. 1-13.

Yu et al., "SPRING: A Sparsity-Aware Reduced-Precision Monolithic 3D CNN Accelerator Architecture for Training and Inference", 2016, pp. 1-14.

Zhang, et al., "Thread: Towards fine-grained precision reconfiguration in variable-precision neural network accelerator" *IEICE Electronics Express,* vol. 16(14), 2019, pp. 1-6.

Zhao, "Optimising Convolutional Neural Networks for Reconfigurable Acceleration", *Imperial College London: Department of Computing,* 2017, 79 pages.

Vercauteren et al., "Constructing Application-Specific Heterogeneous Embedded Architectures from Custom HW/SW Applications," 33rd Design Automation Conference Proceedings, Jun. 1996, pp. 521-526.

Zhou et al.,"A 0.5V 29pJ/Cycle Sensor Node Processor for Intelligent Sensing Applications," 2014 International SoC Design Conference (ISOCC), Nov. 2014, pp. 70-71.

* cited by examiner

RECONFIGURABLE HARDWARE BUFFER IN A NEURAL NETWORKS ACCELERATOR FRAMEWORK

BACKGROUND

Technical Field

The present disclosure generally relates to neural networks. More particularly, but not exclusively, the present disclosure relates to utilization of hardware resources in a neural networks accelerator framework.

Description of the Related Art

Known computer vision, speech recognition, and signal processing applications benefit from the use of convolutional neural networks (CNN). A CNN is a computer-based tool that processes large quantities of data and adaptively "learns" by conflating proximally related features within the data, making broad predictions about the data, and refining the predictions based on reliable conclusions and new conflations. The CNN is arranged in a plurality of "layers," and different types of predictions are made at each layer.

For example, if a plurality of two-dimensional pictures of faces is provided as input to a CNN, the CNN will learn a variety of characteristics of faces such as edges, curves, angles, dots, color contrasts, bright spots, dark spots, etc. These one or more features are learned at one or more first layers of the CNN. Then, in one or more second layers, the CNN will learn a variety of recognizable features of faces such as eyes, eyebrows, foreheads, hair, noses, mouths, cheeks, etc.; each of which is distinguishable from all of the other features. That is, the CNN learns to recognize and distinguish an eye from an eyebrow or any other facial feature. In one or more third and then subsequent layers, the CNN learns entire faces and higher order characteristics such as race, gender, age, emotional state, etc. The CNN may even be taught in some cases to recognize the specific identity of a person. For example, a random image can be identified as a face, and the face can be recognized as Orlando Bloom, Andrea Bocelli, or some other identity.

In other examples, a CNN can be provided with a plurality of pictures of animals, and the CNN can be taught to identify lions, tigers, and bears; a CNN can be provided with a plurality of pictures of automobiles, and the CNN can be taught to identify and distinguish different types of vehicles; and many other CNNs can also be formed and trained. CNNs can be used to learn word patterns in sentences, to identify music, to analyze individual shopping patterns, to play video games, to create traffic routes, and CNNs can be used for many other learning-based tasks too.

BRIEF SUMMARY

Techniques and systems are described herein for implementing a convolutional neural network.

In an embodiment, a convolutional accelerator framework (CAF) comprises a plurality of processing circuits including one or more convolution accelerators, a reconfigurable hardware buffer configurable to store data of a variable number of input data channels, and a stream switch coupled to the plurality of processing circuits. The reconfigurable hardware buffer has a memory and control circuitry. A number of the variable number of input data channels is associated with an execution epoch. In operation, the stream switch streams data of the variable number of input data channels between processing circuits of the plurality of processing circuits and the reconfigurable hardware buffer during processing of the execution epoch and the control circuitry of the reconfigurable hardware buffer configures the memory to store data of the variable number of input data channels during processing of the execution epoch, the configuring including allocating a portion of the memory to each of the variable number of input data channels.

In an embodiment, the memory comprises an input buffer memory, a mirror buffer and a random access memory (RAM). The allocating a portion of the memory to an input data channel of the variable number of input data channels includes determining a size of an input buffer of the input buffer memory to allocate to the input data channel, determining a word size of the mirror buffer and determining a size of subRAM of the RAM to allocate to the input data channel. In an embodiment, the word size of the mirror buffer is a function of the size of the subRAM allocated to the channel. In an embodiment, the subRAM is configured as a first-in-first-out memory. In an embodiment, the control circuitry of the reconfigurable hardware buffer, in operation, reconfigures the memory between processing of a first execution epoch and processing of a second execution epoch. In an embodiment, the variable number is an element of the set of numbers {0, 1, 2, 3, 4}.

In an embodiment, the reconfigurable hardware buffer comprises an output interface, and the control circuitry, in operation, configures the output interface to provide a variable number of output data channels. In an embodiment, in operation, configuring the output interface to provide an output data channel of the variable number of output data channels comprises providing a mirrored output of an input data channel of the variable number of input data channels. In an embodiment, in operation, configuring the output interface to provide an output data channel of the variable number of output data channels comprises providing a reshaped output of an input data channel of the variable number of input data channels. In an embodiment, in operation, the reshaped output is provided, via the stream switch, as an input to a convolutional accelerator of the one or more convolutional accelerators, wherein the convolutional accelerator, in operation, performs a dilated convolution operation of the execution epoch using the reshaped output. In an embodiment, in operation, the variable number of input data channels is equal to the variable number of output data channels. In an embodiment, in operation, the variable number of input data channels is less than the variable number of output data channels. In an embodiment, the control circuitry comprises a number of counters and control logic, and, in operation, the control logic uses the counters to track storage of data of the variable number of input data channels in the memory and to control providing of stored data to the variable number of output data channels.

In an embodiment, a system to implement a neural network (NN), such as a convolutional neural network (CNN) comprises: a host processor; a main memory; and an accelerator framework (AF), such as a convolutional accelerator framework (CAF). The convolutional accelerator framework includes: a plurality of processing circuits including one or more accelerators, such as one or more convolutional accelerators; a reconfigurable hardware buffer configurable to store data of a variable number of input data channels, the reconfigurable hardware buffer having: a memory; and control circuitry; and a stream switch coupled to the plurality of processing circuits and to the reconfigurable hardware buffer. In operation, a number of the variable number of input data channels is associated with an execution epoch of the CNN; the stream switch streams data of the variable number of input data channels between processing circuits of the plurality of processing circuits and the reconfigurable hardware buffer during processing of the execution epoch; and the control circuitry of the reconfigurable hardware buffer configures the memory of the reconfigurable hardware buffer to store data of the variable number of input data channels during processing of the execution epoch, the configuring including allocating a portion of the memory of the reconfigurable hardware buffer to each of the variable number of input data channels.

In an embodiment, the memory of the reconfigurable hardware buffer comprises an input buffer memory, a mirror buffer and a random access memory (RAM), and the allocating a portion of the memory of the reconfigurable hardware buffer to an input data channel of the variable number of input data channels includes determining a size of an input buffer of the input buffer memory to allocate to the input data channel, determining a word size of the mirror buffer and determining a size of subRAM of the RAM to allocate to the input data channel. In an embodiment, the size of a mirror buffer allocated to the input data channel is a function of the determined size of the subRAM. In an embodiment, the reconfigurable hardware buffer comprises an output interface, and the control circuitry, in operation, configures the output interface to provide a variable number of output data channels. In an embodiment, in operation, configuring the output interface to provide an output data channel of the variable number of output data channels comprises providing a reshaped output of an input data channel of the variable number of input data channels. In an embodiment, the system comprises an integrated circuit including the host processor, the main memory and the convolutional accelerator framework.

In an embodiment, a method comprises processing an execution epoch of a convolutional neural network using a convolutional accelerator framework having a plurality of processing circuits, a stream switch and a reconfigurable hardware buffer. The processing of the execution epoch includes: configuring a variable number of input data channels of a reconfigurable hardware buffer of the convolutional accelerator framework, a number of the variable number of input data channels being associated with the execution epoch, the configuring including allocating a portion of a memory of the reconfigurable hardware buffer to each of the variable number of input data channels; streaming, via the stream switch, data of the variable number of input data channels between processing circuits of the plurality of processing circuits and the reconfigurable hardware buffer; and storing data of the variable number of input data channels in the memory of the reconfigurable hardware buffer based on the allocating of portions of the memory to the variable number of input data channels. In an embodiment, the memory comprises an input buffer memory, a mirror buffer and a random access memory (RAM), and the allocating a portion of the memory to an input data channel of the variable number of input data channels includes determining a size of an input buffer of the input buffer memory to allocate to the input data channel, determining a word size of the mirror buffer and determining a size of subRAM of the RAM to allocate to the input data channel. In an embodiment, the method comprises reconfiguring the memory of the reconfigurable hardware buffer between processing of a first execution epoch and processing of a second execution epoch. In an embodiment, the reconfigurable hardware buffer comprises an output interface, and the method comprises configuring the output interface to provide a variable number of output data channels. In an embodiment, configuring the output interface to provide an output data channel of the variable number of output data channels comprises providing a reshaped output of an input data channel of the variable number of input data channels. In an embodiment, the method comprises using counters of the reconfigurable hardware buffer to track storage of data of the variable number of input data channels in the memory and to control providing of stored data to the variable number of output data channels.

In an embodiment, a non-transitory computer-readable medium's contents cause one or more hardware processors of a convolutional accelerator framework to perform a method, the method comprising: processing an execution epoch of a convolutional neural network, the processing of the execution epoch including: configuring a variable number of input data channels of a reconfigurable hardware buffer of the convolutional accelerator framework, a number of the variable number of input data channels being associated with the execution epoch, the configuring including allocating a portion of a memory of the reconfigurable hardware buffer to each of the variable number of input data channels; streaming, via a stream switch of the convolutional accelerator framework, data of the variable number of input data channels between processing circuits of the plurality of processing circuits and the reconfigurable hardware buffer; and storing data of the variable number of input data channels in the memory of the reconfigurable hardware buffer based on the allocating of portions of the memory to the variable number of input data channels. In an embodiment, the memory comprises an input buffer memory, a mirror buffer and a random access memory (RAM), and the allocating a portion of the memory to an input data channel of the variable number of input data channels includes determining a size of an input buffer of the input buffer memory to allocate to the input data channel, determining a word size of the mirror buffer and determining a size of subRAM of the RAM to allocate to the input data channel. In an embodiment, the reconfigurable hardware buffer comprises an output interface, and the method comprises configuring the output interface to provide a variable number of output data channels. In an embodiment, configuring the output interface to provide an output data channel of the variable number of output data channels comprises providing a reshaped output of an input data channel of the variable number of input data channels. In an embodiment, the contents comprise instructions executed by the one or more processors of the convolutional accelerator framework.

The tools and methods discussed in the present disclosure set forth one or more aspects and embodiments of a convolution accelerator in which memory utilized as a reconfigurable hardware buffer may be used to store partial data and reduce the likelihood of concurrency and deadlock issues.

The innovation described in the present disclosure is new and useful, and the innovation is not well-known, routine, or conventional in the silicon fabrication industry. Some portions of the innovation described herein may use known building blocks combined in new and useful ways along with other structures and limitations to create something more than has heretofore been conventionally known. The embodiments improve on known computing systems which, when un-programmed or differently programmed, do not perform or provide the specific reconfigurable features claimed herein.

The embodiments described herein use computerized technology to improve the technology of convolutional accelerators, but other techniques and tools remain available to provide reconfigurable interconnects. Therefore, the claimed subject matter does not foreclose the whole, or any substantial portion of, silicon fabrication or reconfigurable interconnect technological area.

These features, along with other objects and advantages which will become subsequently apparent, reside in the details of construction and operation as more fully described hereafter and claimed, reference being had to the accompanying drawings forming a part hereof.

This Brief Summary has been provided to introduce certain concepts in a simplified form that are further described in detail below in the Detailed Description. The Brief Summary does not identify as key or essential any particular features of the claimed subject matter, nor is it intended to limit the scope of the claimed subject matter.

DETAILED DESCRIPTION

Figure 1:
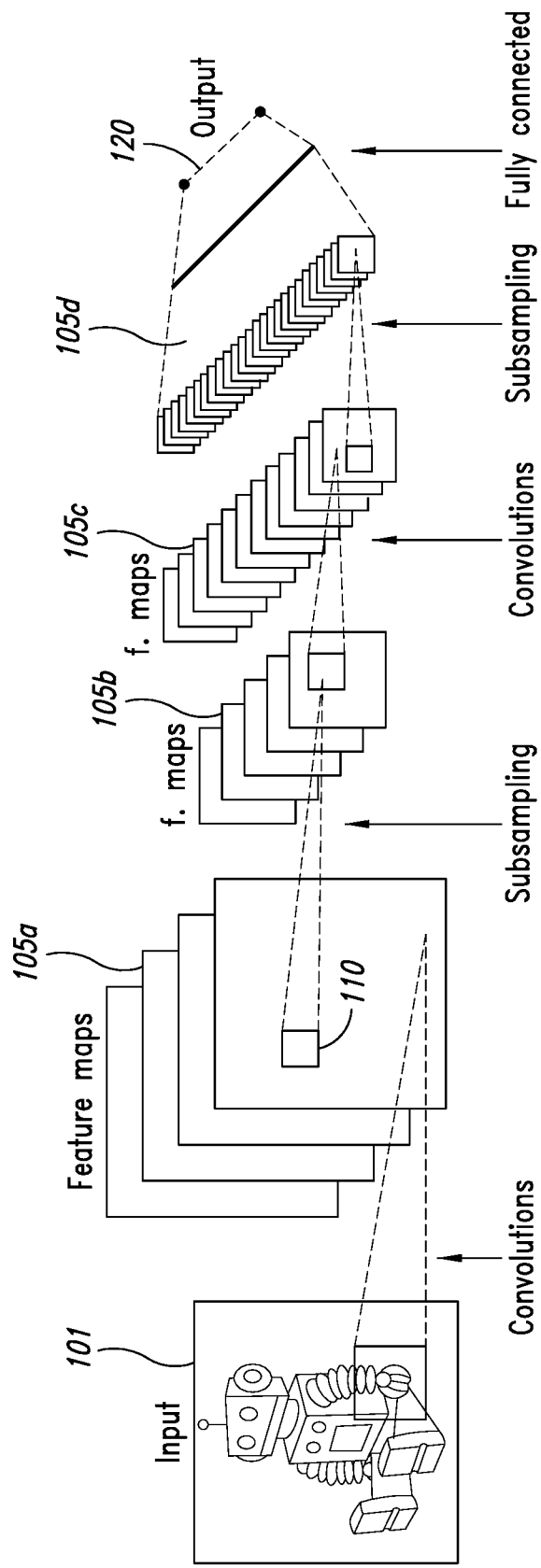
FIG. 1 depicts a process in which a convolutional neural network is used to classify an input image via use of convolutional, subsampling and fully connected layers operating on successive feature maps.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, integrated circuits, logic gates, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Convolutional Neural Networks (CNN) are types of Deep Neural Networks (DNN) with one or multiple layers, each of which perform a convolution on a 3-dimensional (3D) feature data tensor (expressed as width×height×depth). Typically, the convolution operation is associated with a majority of the processing workload, commonly performing a large number of multiply-accumulate (MAC) operations per inference.

Dedicated convolution accelerators are designed to process convolution operations more efficiently, such as by exploiting a higher level of data parallelism than standard processor cores. Many CNNs also include Fully Connected (FC) layers, in which the classical 3D convolution is deformed into a Vector by Matrix operation on a feature data tensor of 1×1×Depth.

FIG. 1 depicts a process in which a CNN is used to classify an input image 101 via alternating use of convolutional and subsampling layers of the CNN operating on successive feature maps to arrive at a classification output for the input image via a fully connected layer. In particular, multiple first feature maps 105a are generated from the input image 101 by a first convolutional layer using a kernel 110. Multiple second feature maps 105b are then generated by a first subsampling layer of the CNN, and then utilized in turn to generate a larger plurality of third feature maps 105c by a second convolutional layer of the CNN. In the depicted embodiment, a second subsampling layer of the CNN generates another still larger plurality of fourth feature maps 105d, which are accepted as input by a fully connected layer of the CNN in order to generate an N-dimensional output classification vector 120. CNNs may be employed, for example, to classify acoustic scenes, to recognize activities based on sensor data, to classify heartbeat signals, to recognize faces or facial emotion, etc.

Figure 2:
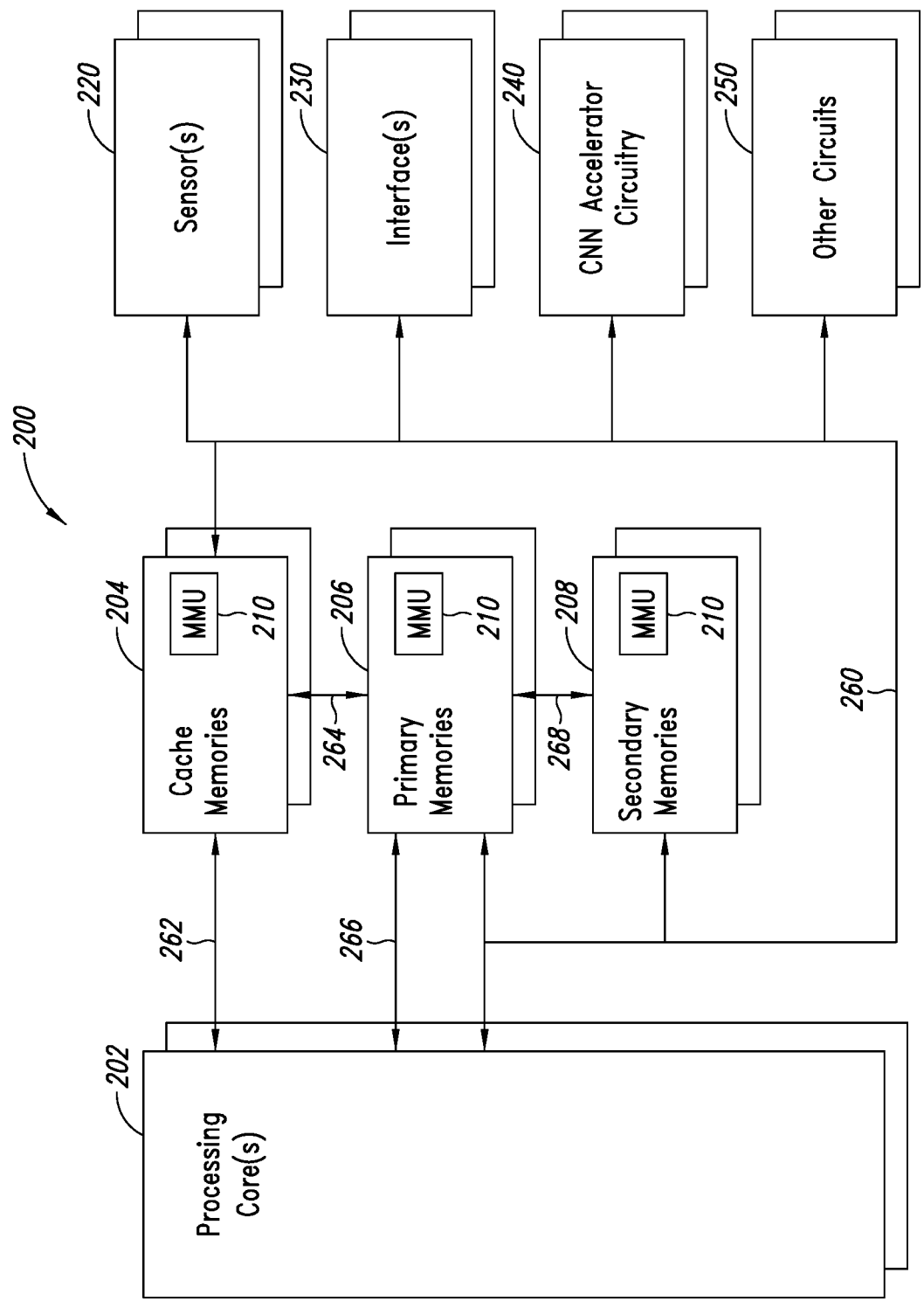
FIG. 2 is a functional block diagram of an embodiment of an electronic device or system implementing an artificial neural network (ANN) that employs one or more convolutional accelerators in accordance with one or more embodiments disclosed herein.

FIG. 2 is a functional block diagram of an embodiment of an electronic device or system 200 of the type to which the embodiments which will be described may apply. The system 200 comprises one or more processing cores or circuits 202. The processing cores 202 may comprise, for example, one or more processors, a state machine, a microprocessor, a programmable logic circuit, discrete circuitry, logic gates, registers, etc., and various combinations thereof. The processing cores may control overall operation of the system 200, execution of application programs by the system 200, etc.

The system 200 includes one or more memories, such as one or more volatile and/or non-volatile memories which may store, for example, all or part of instructions and data related to control of the system 200, applications and operations performed by the system 200, etc. As illustrated, the system 200 includes one or more cache memories 204, one or more primary memories 206, and one or more secondary memories 208, each comprising memory management circuitry or MMUs 210.

The system 200 may include one or more sensors 220 (e.g., accelerometers, pressure sensors, temperature sensors, etc.), one or more interfaces 230 (e.g., wireless communication interfaces, wired communication interfaces, etc.), one or more artificial neural network (ANN) circuits, as illustrated convolutional neural network (CNN) accelerator circuits 240, and other circuits 250, which may include other functional circuits, antennas, power supplies, etc., and a main bus system 260. The main bus system 260 may include one or more data, address, power and/or control buses coupled to the various components of the system 200. The system 200 also may include additional bus systems such as bus system 262, which communicatively couples the cache memory 204 and the processing core 202, bus system 264, which communicatively couples the cache memory 204 and the primary memory 206, bus system 266, which communicatively couples the primary memory 206 and the processing core 202, and bus system 268, which communicatively couples the primary memory 206 and the secondary memory 208.

Figure 3:
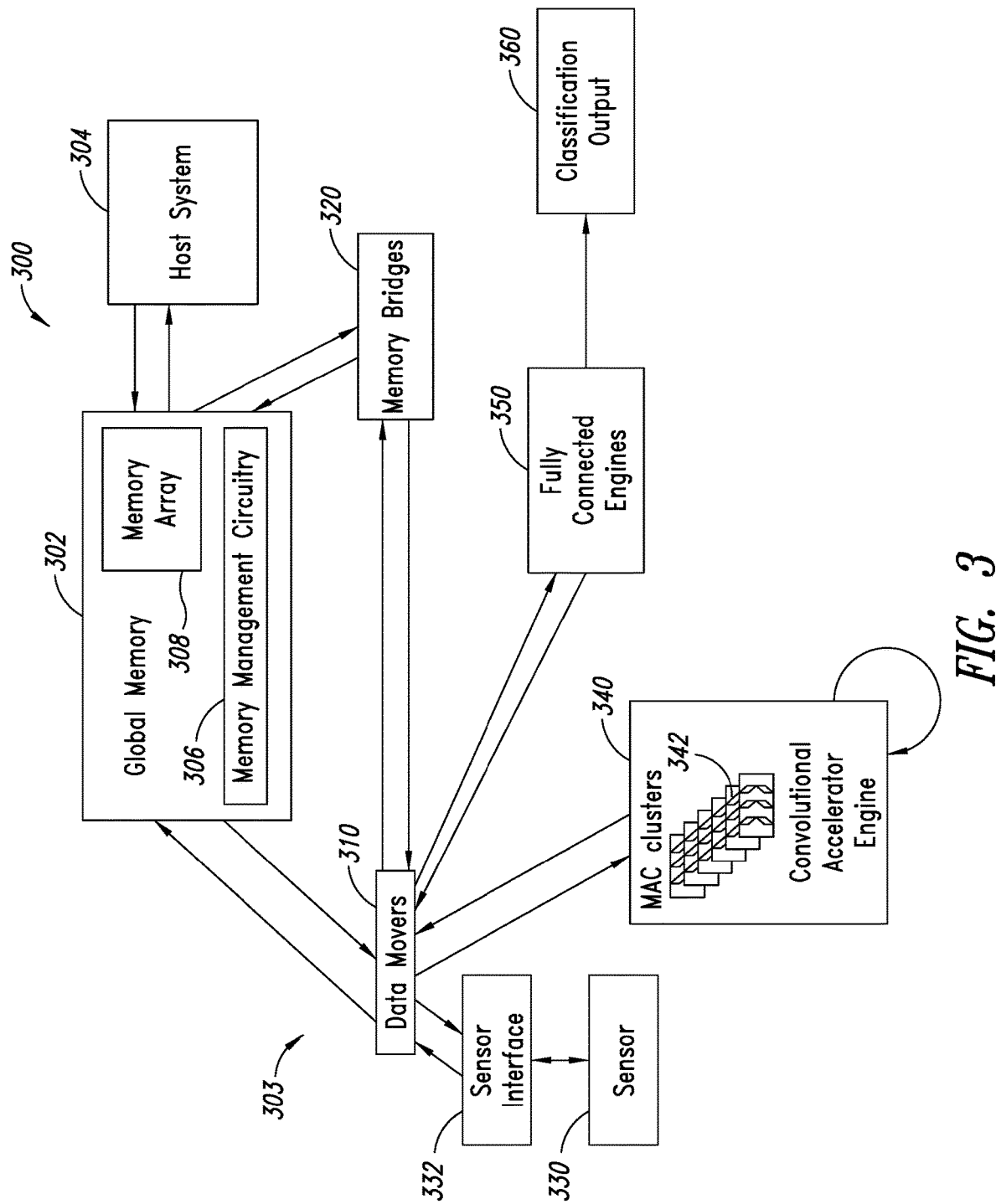
FIG. 3 is a functional block diagram of an embodiment of an electronic device or system implementing an artificial neural network that employs one or more convolutional accelerators in accordance with one or more embodiments disclosed herein.

FIG. 3 is a functional block diagram of an embodiment of an electronic device or system 300 of the type to which the embodiments which will be described may apply. The system 300 may be used, for example, to implement an ANN to classify sensor data. It is noted that the embodiment of FIG. 2 may be employed to implement the embodiment of FIG. 3, and may comprise a system on a chip (SoC).

The system 300 comprises a global memory 302, which may serve for example as a primary memory (see primary memory 206 of FIG. 1), for both ANN 303 processes or clusters, and for host system 304 processes or clusters. The global memory 302 comprises memory management circuitry 306 and one or more shared memory arrays 308. The memory management circuitry 306, in operation, employs one or more memory management routines to allocate regions of the global memory 302, such as regions of the shared memory arrays 308 to various processes executed by the system 300, and to control accesses to the global memory 302, such as accesses to regions of the shared memory arrays 308.

As illustrated, the ANN 303 comprises one or more data movers 310, one or more memory bridges 320, one or more sensors 330 and corresponding sensor interfaces 332, one or more convolutional accelerator engines 340, and one or more fully connected engines 350, which may be implemented and operate in an otherwise conventional manner to produce a classification output 360. As illustrated, the convolutional accelerator engine 340 includes a plurality of multiply-accumulate (MAC) circuits in a MAC cluster 342.

The data movers 310, in operation, move data streams between IOs (e.g., sensor interfaces 332), memory hierarchies (e.g., global memory 302, memory bridges 320), convolutional accelerators 340 and fully connected engines 350.

In an embodiment, the convolutional accelerator engines 340 may comprise an array of clustered multiply-accumulate (MAC) units or circuits 342, which, in operation, implement the convolutional layer processing in ANN. The convolutional accelerator engines may include a line buffer to fetch multiple feature map data words in parallel with a single memory access. A register-based kernel buffer may be used which provides multiple read ports, while a plurality of multibit fixed point MAC units or circuits perform multiple MAC operations per clock cycle. An adder tree may be employed to sum the MAC results for each kernel column.

In some embodiments, the system 200 or the system 300 may include more components than illustrated, may include fewer components than illustrated, may split illustrated components into separate components, may combine illustrated components, etc., and various combinations thereof. For example, in some embodiments, the primary memory 206 and the secondary memory 208 may be combined into a single memory. In another example, in some embodiments the convolutional accelerator engines 340 and the fully connected engines 350 may be combined.

Convolutional layers typically carry on convolution operations between inputs and convolutional kernels, nonlinear activation functions (such as rectifiers) and max pooling operations, which are usually the most demanding ones in terms of computational effort. The operations generally cannot, as a practical matter, be done at once, due to the high number of operations to be performed. The operations may be developed in several stages and the partial data may be organized accordingly.

Figure 4:
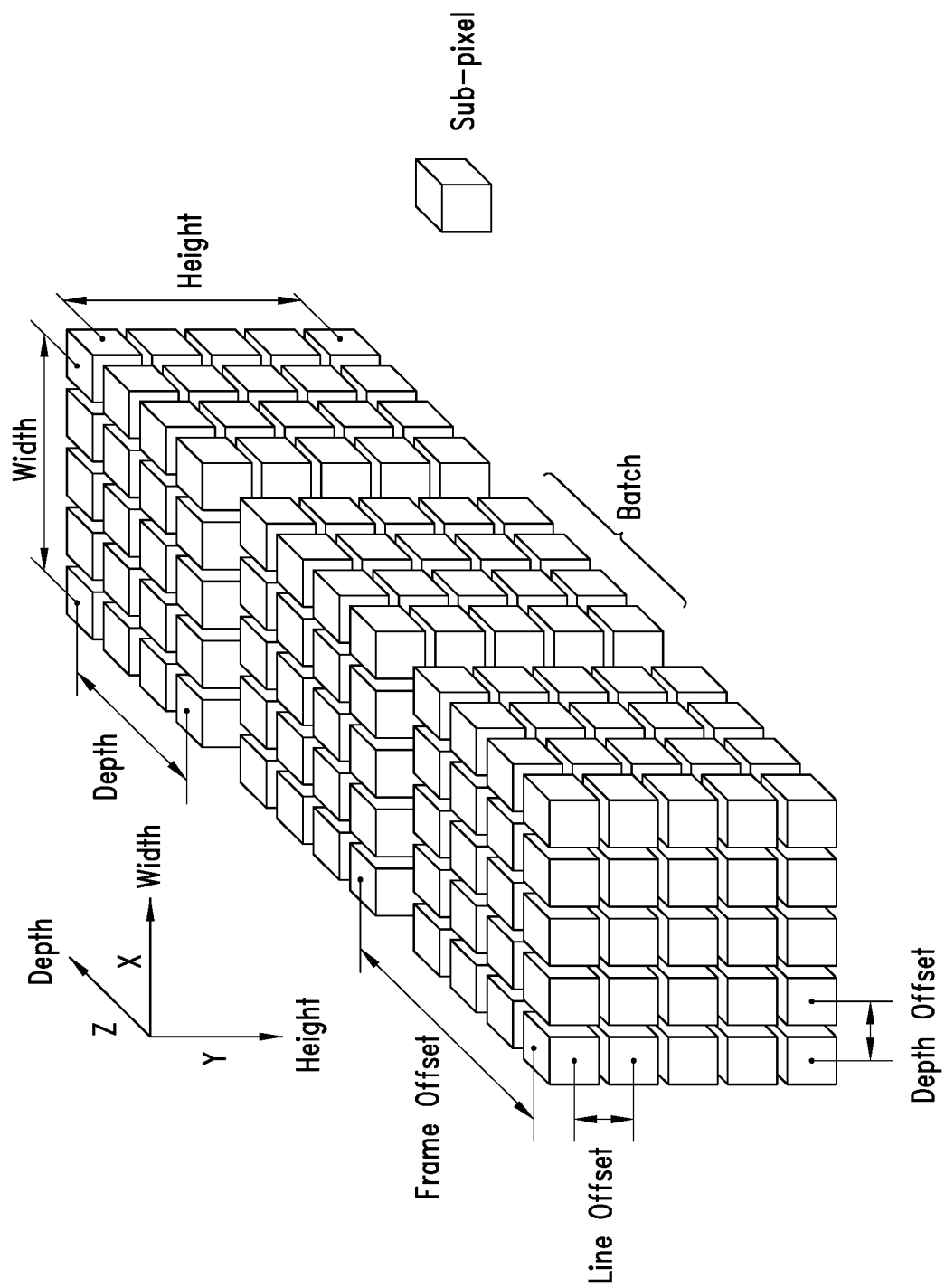
FIG. 4 is a conceptual diagram for illustrating organization of data into execution epochs and channel data blocks along the three spatial dimensions

The amount of data to be processed may be divided using channel data segmentation strategies and employ execution epochs, organizing the processing to subdivide the overall operation in smaller groups with respect to both time and space. Streaming memory access concepts may be employed. The data to be processed may, for example, be organized in execution epochs and channel data blocks along the three spatial dimensions, as conceptually depicted in FIG. 4. Data blocks may be created taking into account a number of channels and a size of the incoming data. Elements may be written into memory, for example, in a depth (z), width (x) and height (y) order. Various parameters and definitions may be employed to indicate the data to be processed in an execution epoch. Partial data produced from the different data blocks may be reorganized and used in subsequent processing, such as processing of a subsequent execution epoch.

Figure 5:
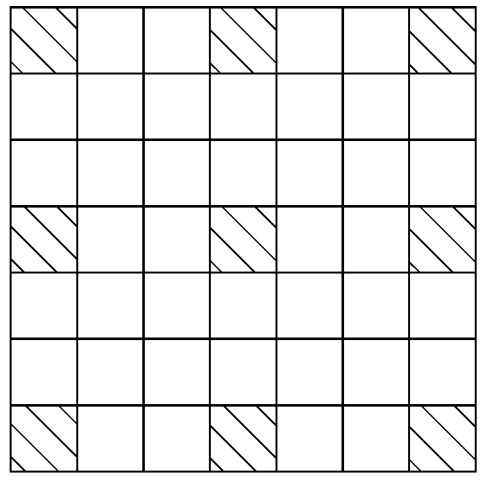
FIG. 5 is a conceptual diagram for illustrating data to be considered in convolutions for various example dilation rates d.
Figure 5:
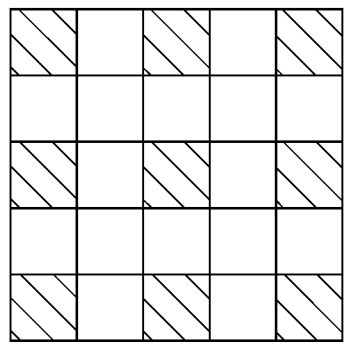
Figure 5:
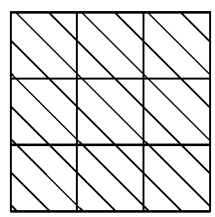

Various convolutional operations may be employed, such as a dilated convolution operation (also known as atrous convolution), in which a dilation rate, d, determines spacing between two values to be considered in a convolution operation. Dilated convolutional operations may be employed to increase a considered receptive field. FIG. 5 conceptually illustrates data to be considered in convolutions for various example dilation rates d. As illustrated, when d is one, all of the data values are considered, when d is 2, every other data value is considered, and when d is 3, every third data value is considered.

Figure 6:
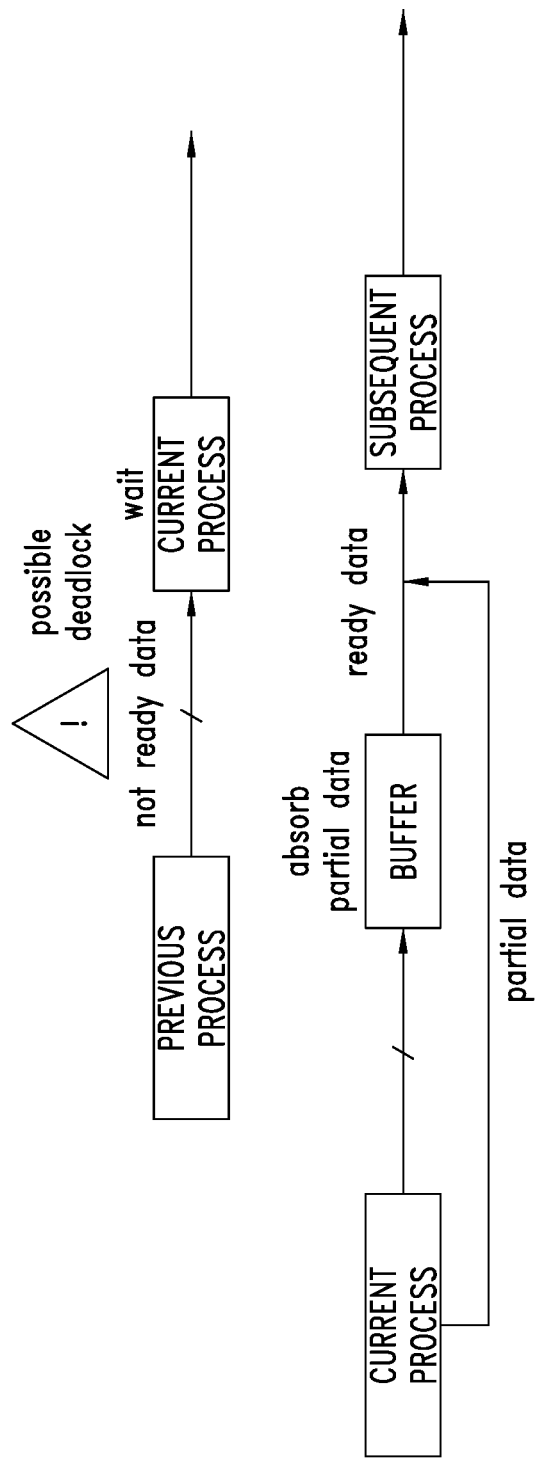
FIG. 6 is a conceptual diagram for illustrating possible deadlock and data loss conditions that may arise during various operations performed by a convolutional neural network.

FIG. 6 conceptually illustrates possible deadlock and data loss conditions that may arise during various operations performed by a convolutional neural network, such as convolutions, pooling, arithmetic operations, etc. A possible deadlock may occur when data from a previous process (e.g., one or more outputs of a convolutional accelerator such as convolutional accelerator 340 of FIG. 3) is not ready in time to be used as input data to a current process (e.g., as an input of the convolutional accelerator for the current process or an input of another convolutional accelerator). As illustrated, a wait state may be applied to the current process until the data is ready.

A data loss condition may occur when data from a current process is ready before a subsequent process is ready to use the data. As illustrated in FIG. 6, the data may be stored in a buffer to prevent loss of the data before the subsequent process is ready to process the data.

Figure 7:
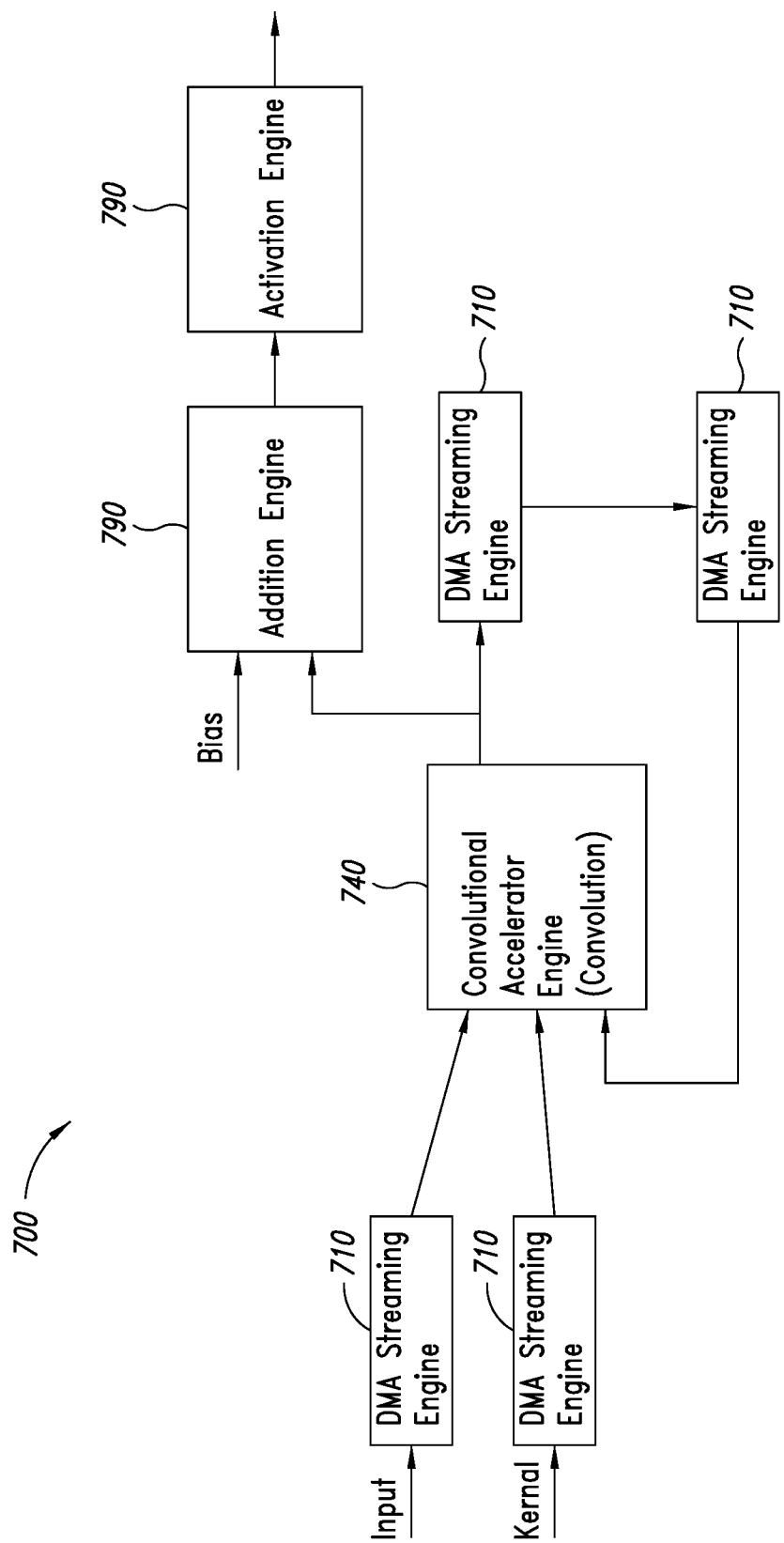
FIG. 7 is a conceptual diagram for illustrating storing intermediate accumulation results in system memory during processing of a data execution epoch by a CNN.

FIG. 7 is a conceptual diagram illustrating an example of storing intermediate accumulation results in system memory during processing of a data execution epoch by a CNN 700. The dataflow chain of FIG. 7 illustrates a dataflow of a loop or iterative process, in which an output of convolutional accelerator 740 is provided as an input to the convolutional accelerator for a subsequent processing round. The dataflow chain includes a fork, in which the output of the convolutional accelerator 740 also is provided to other functional circuits 790 of an accelerator framework, as illustrated to an addition engine and then to an activation engine. Feature data tensors with a large number of channels are handled by buffering intermediate accumulation results output from a convolutional accelerator engine 740 in software buffers of system memory (see memory 302 of FIG. 3) using two stream engines 710 (see data handlers 310 of FIG. 3), so that the data is ready to input to the convolutional accelerator in the next processing round.

Figure 8:
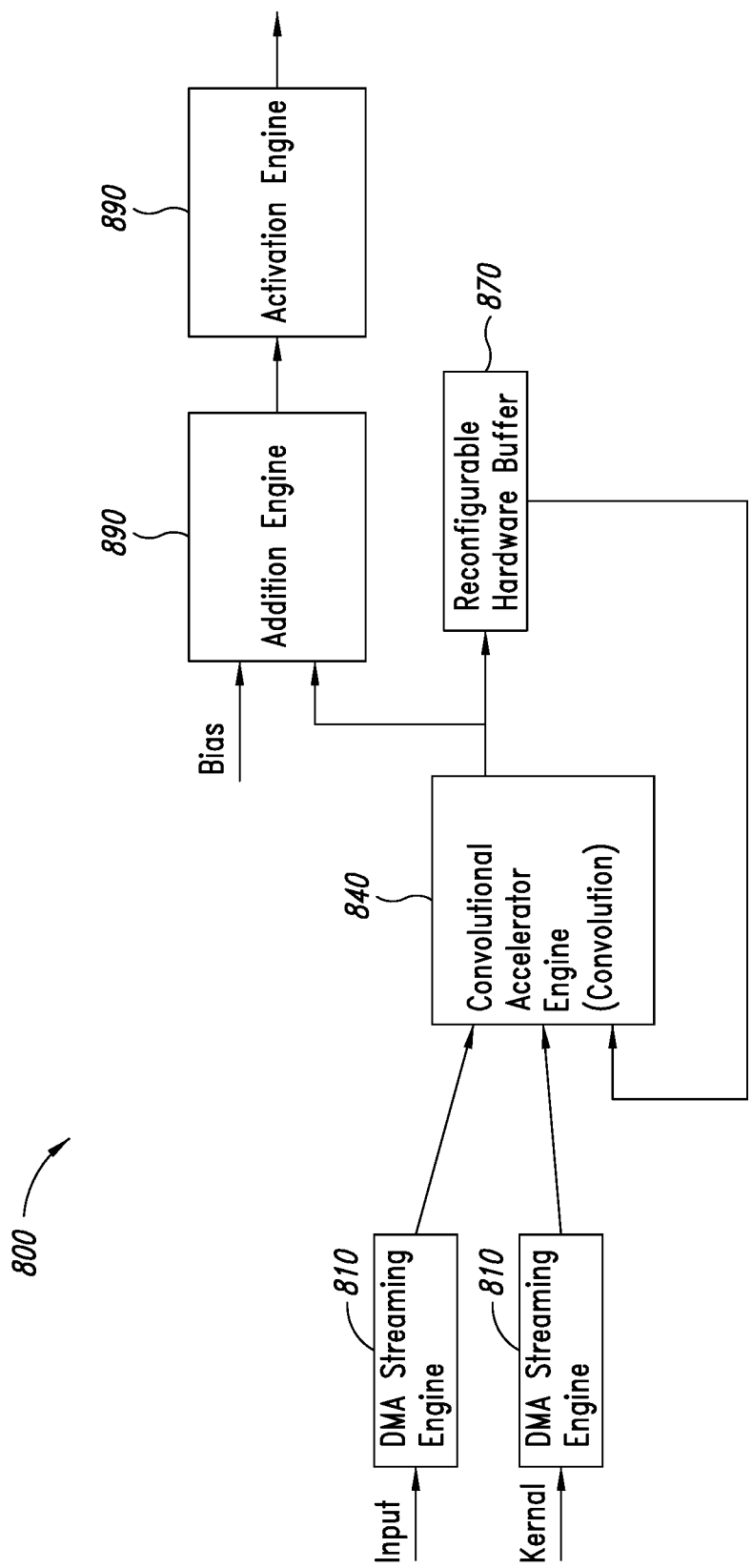
FIG. 8 is a conceptual diagram for illustrating an example of storing intermediate accumulation results in a reconfigurable hardware buffer during processing of a data execution epoch by a CNN.

FIG. 8 is a conceptual diagram illustrating an example of storing intermediate accumulation results output from a convolutional accelerator engine 840 in a reconfigurable hardware buffer during processing of a data execution epoch by a CNN 800. The dataflow chain of FIG. 8, like the dataflow chain of FIG. 7, illustrates a loop or iterative process, in which an output of convolutional accelerator 840 is provided as an input to the convolutional accelerator for a subsequent processing round. The dataflow chain includes a fork, in which the output of the convolutional accelerator 840 also is provided to other functional circuits 890 of an accelerator framework, as illustrated to an addition engine and an activation engine. Feature data tensors with a large number of channels are handled by buffering intermediate accumulation results in reconfigurable hardware buffer 870. The reconfigurable hardware buffer facilitates avoiding the need to buffer intermediate results in system memory when enough storage space can be allocated in the reconfigurable hardware buffer 870. Fewer streaming engines may need to be employed during processing of the execution epoch (which facilitates using the streaming engines for other tasks). As illustrated, the use of two streaming engines 710/810 is avoided as compared to the example of FIG. 7, in which software buffers in system memory are used to store intermediate results, and less memory bandwidth may be employed during processing of an epoch by the embodiment of FIG. 8. Thus, using a reconfigurable hardware buffer to store intermediate results facilitates improving processor throughput and reducing power consumption.

Figure 9:
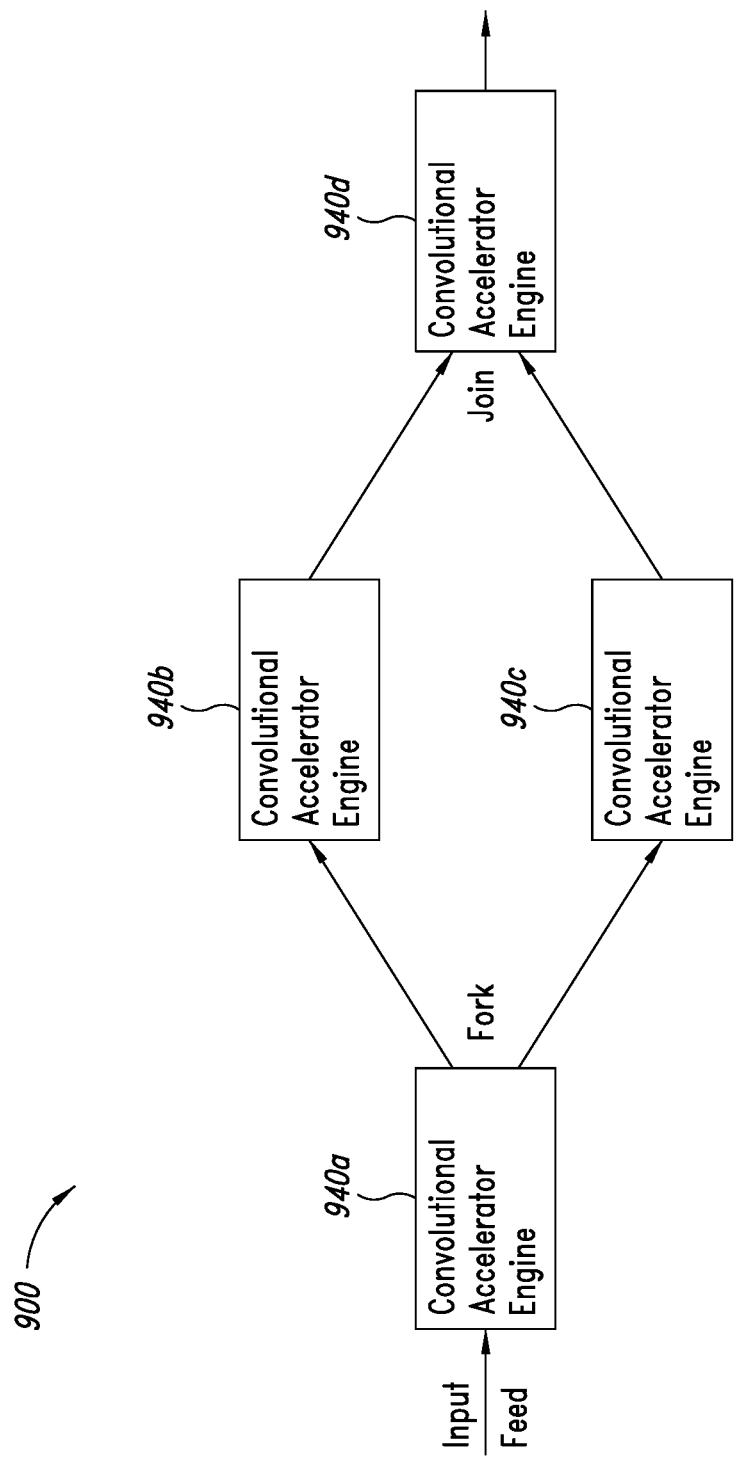
FIG. 9 is a conceptual diagram for illustrating forks and joins in a dataflow chain.

FIG. 9 is a conceptual diagram illustrating forks and joins in a dataflow chain 900. As illustrated, an input feed is processed by a convolutional accelerator engine 940a, and the output of convolutional accelerator engine 940a is forked and provided (in whole or in part) to convolutional accelerator engines 940b and 940c. The outputs of convolutional accelerators 940b and 940c are joined again (in whole or in part) and provided as input to convolutional accelerator 940d. The chain 900 may incur concurrency and deadlock issues with respect to the inputs to convolutional accelerator 940d, for example, if the timing of the outputs of convolutional accelerators 940b and 940c are misaligned in time.

Figure 10:
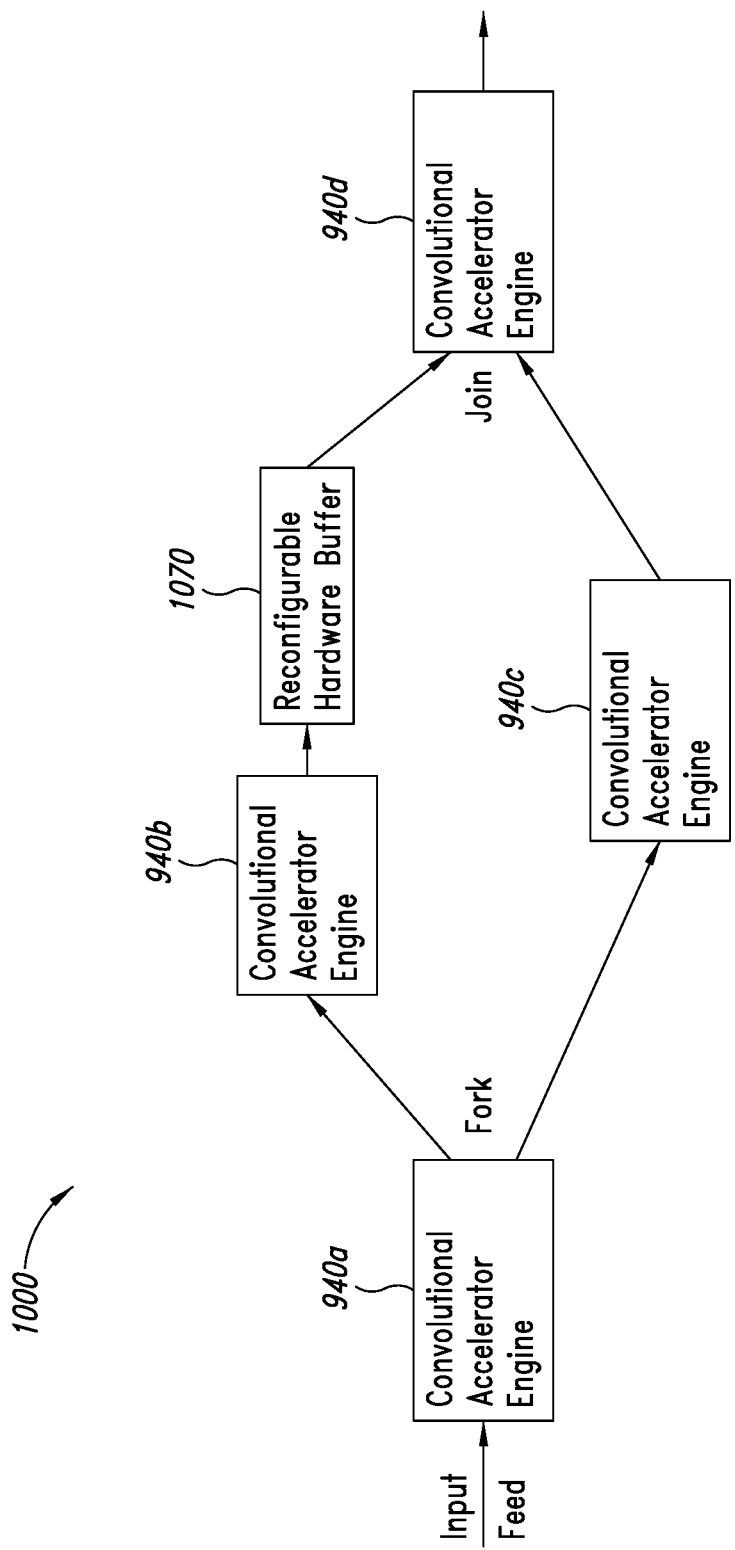
FIG. 10 is a conceptual diagram for illustrating forks and joins in a dataflow chain in which a reconfigurable hardware buffer is employed to buffer data in the dataflow chain.

FIG. 10 is a conceptual diagram illustrating forks and joins in a dataflow chain 1000 in which a reconfigurable hardware buffer 1070 is employed to buffer data in the dataflow chain, for example until data from a process in the chain is ready to be joined with the buffered data. As illustrated, an input feed is processed by a convolutional accelerator engine 940a, and the output of convolutional accelerator engine 940a is forked and provided (in whole or in part) to convolutional accelerator engines 940b and 940c. The output of convolutional accelerator 940b is buffered in reconfigurable hardware buffer 1070 before it is joined with the output of convolutional accelerator 940c and provided as input to convolutional accelerator 940d. The reconfigurable hardware buffer facilitates avoiding concurrency and deadlock issues with respect to the input to convolutional accelerator 940d, for example, if the output of convolutional accelerator 940b is ready before the output of convolutional accelerator 940c to which it is to be joined is ready.

Other fork and join chains may be employed in some embodiments, and the reconfigurable hardware buffer may buffer outputs of multiple convolutional accelerators in a chain. For ease of illustration, FIGS. 9 and 10 illustrate dataflow chains having multiple convolutional accelerator engines. Various different types of engines may be employed in a dataflow chain (e.g., addition engines, activation engines, etc., and various combinations thereof), and looped or iterative operations may be performed.

Figure 11:
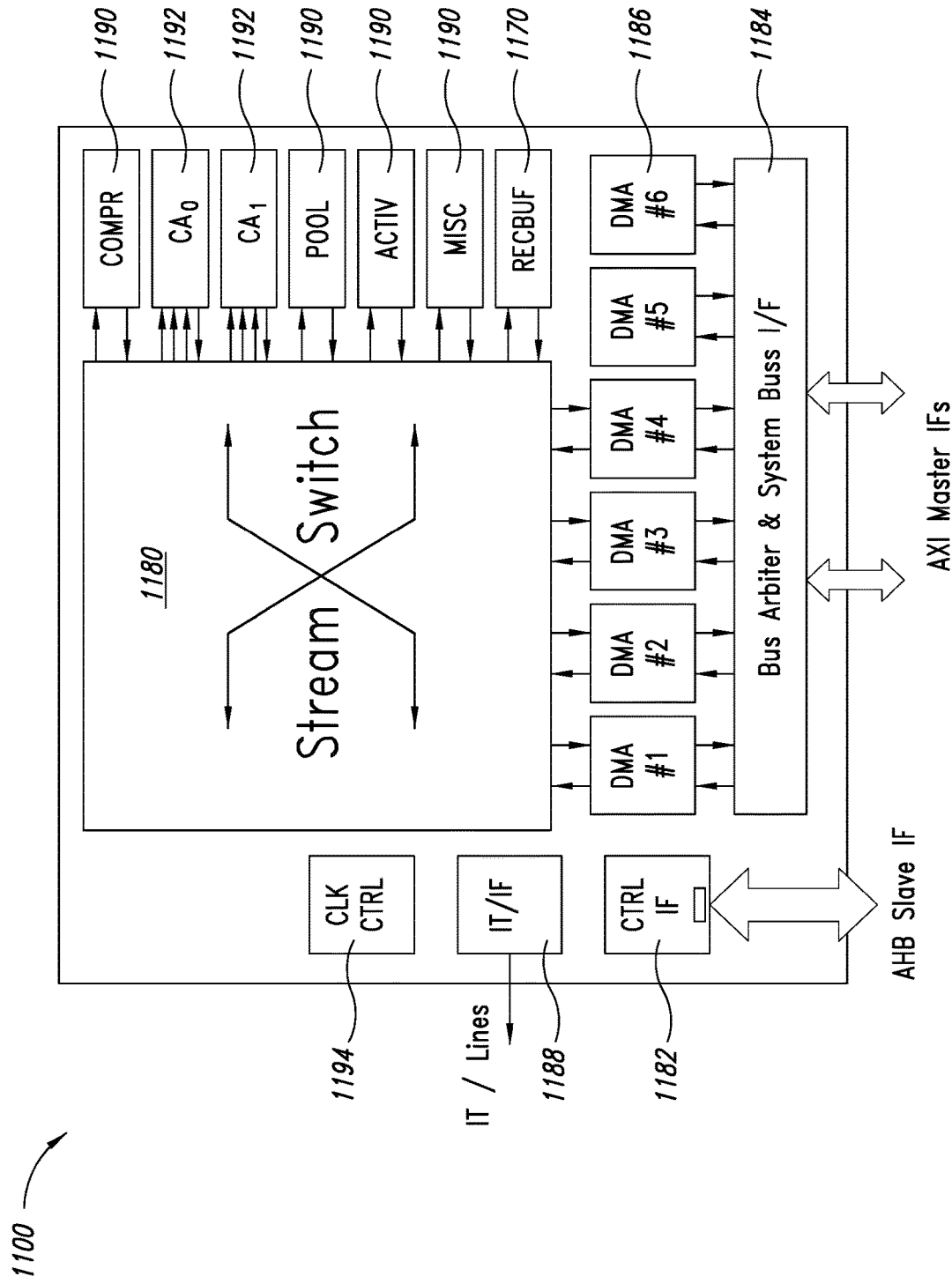
FIG. 11 is a functional block diagram of an embodiment of a convolutional accelerator framework including a reconfigurable hardware buffer.

FIG. 11 is a functional block diagram of an embodiment of a convolutional accelerator framework (CAF) 1100 including a reconfigurable hardware buffer 1170. As illustrated, the convolutional accelerator framework 1100 also comprises a stream switch 1180, a control interface 1182 (e.g., an Advanced High Performance Bus (AHB to couple to an AHB slave device)), a system bus interface 1184, one or more DMA engines 1186 (e.g., DMA controllers), one or more external device interfaces 1188, one or more processing modules or circuits 1190 (e.g., a data compression/decompression module, a pooling function module, an activation function module, an adder, etc.), one or more convolution accelerators 1192, and a clock control circuit 1194.

The stream switch 1180 is, for example, a reconfigurable unidirectional interconnection structure formed with a plurality of unidirectional stream links. The stream links may be arranged to transport multibit data streams from accelerators, interfaces, and other logic modules or circuits of the convolutional accelerator framework 1100 to the stream switch 1180 and from the stream switch 1180 to accelerators, interfaces, and other logic modules or circuits of the convolutional accelerator framework 1100.

The system bus interface 1184 provides an interface to other circuits of a system including the convolutional accelerator framework 1100, such as a host system and a global memory. See host system 304 and global memory 302 of FIG. 3.

The DMA engines 1186 are arranged to provide bidirectional channels for input data flow, output data flow, or input and output data flow. Substantial quantities of data may be passed into the CAF 1100, out from the CAF 1100, or into and out from the CAF 1100.

In one exemplary embodiment, one or more DMA engines 1186 are connected to the stream switch 1180 with one input and one output port. The DMA engines 1186 can be configured in an input or output mode. The DMA engines 1186 can be configured to pack and send data to any address location accessible on any bus or other address location. The DMA engines 1186 can also additionally or alternatively be configured to unpack fetched data and translate the unpacked data into a data stream.

Figure 12:
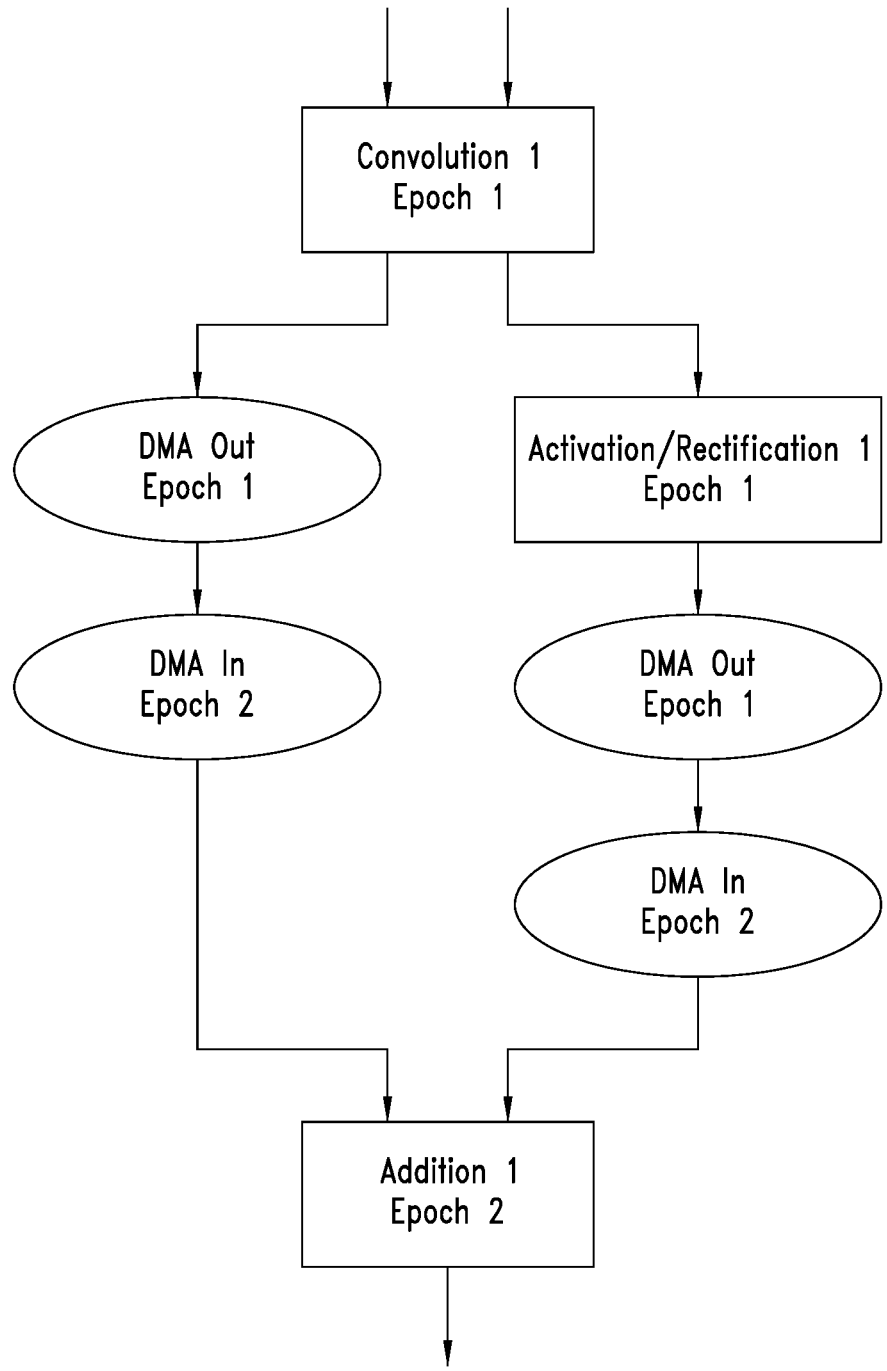
FIGS. 12 and 13 are conceptual diagrams for illustrating addressing concurrency issues and simplifying of dataflow processes of execution epochs through the use of a configurable hardware buffer.
Figure 13:
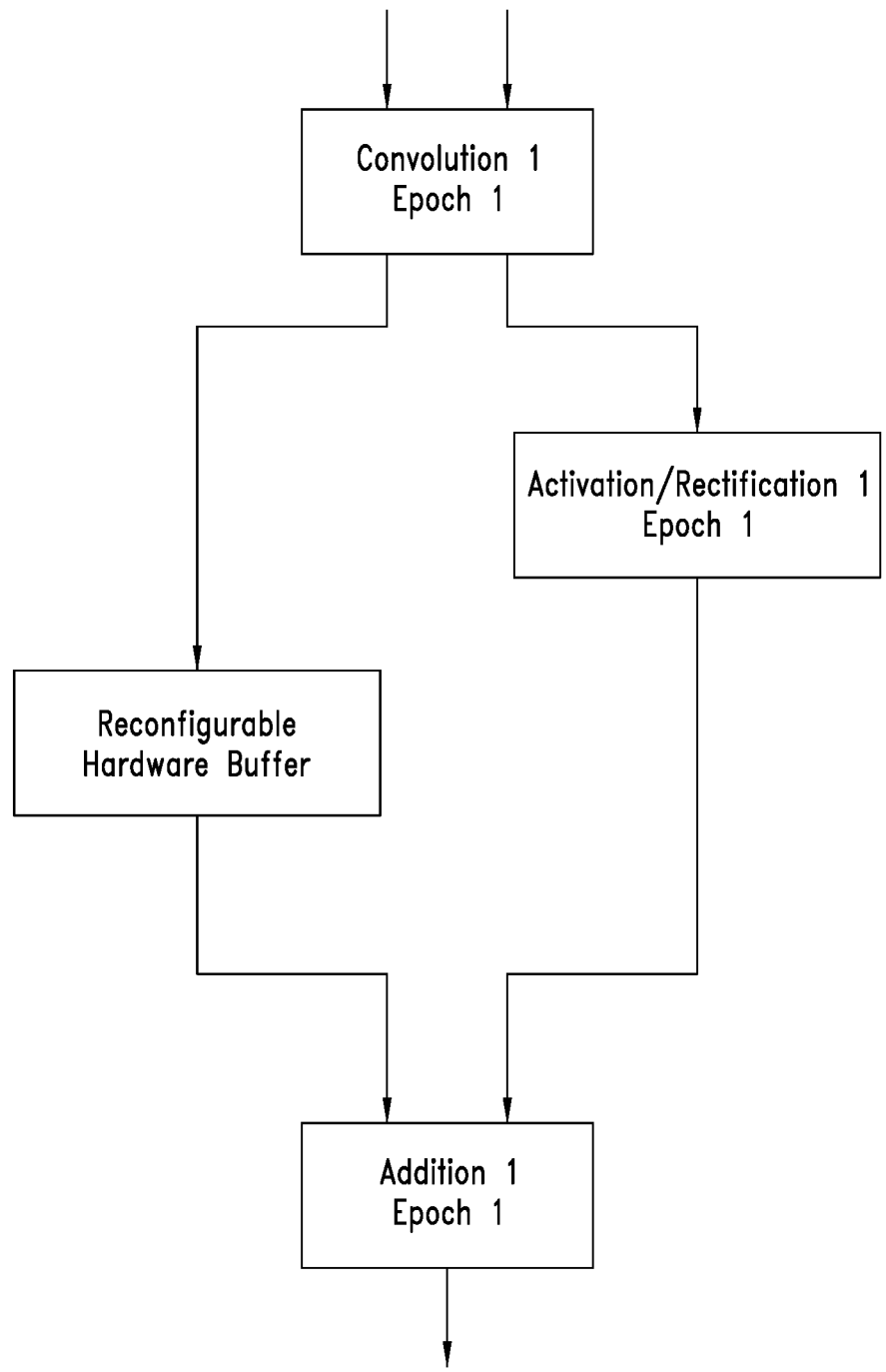

FIGS. 12 and 13 are conceptual diagrams for illustrating employing a reconfigurable hardware buffer to address concurrency issues and simplify dataflow chains of epochs. FIG. 12 illustrates implementation of a process using two epochs, and will be described for convenience with reference to FIG. 11. As illustrated, a first epoch, Epoch 1, performs a convolution operation, Convolution 1, for example, using one of the convolutional accelerators 1192 of FIG. 11. The first epoch, Epoch 1, then performs an activation/rectification function, Activation/Rectification 1, on the results of the convolution operation, Convolution 1, for example using activation function module or circuit 1190 of FIG. 11. A second epoch, Epoch 2, performs an addition operation, Addition 1, having as inputs the results of the convolution operation, Convolution 1, and the results of the activation/rectification operation, Activation/Rectification 1.

In the embodiment of FIG. 12, because the outputs of the convolution and activation/rectification operations will not necessarily be ready at the same time, four DMA streaming operations are performed so that the outputs of Epoch 1 may be stored until Epoch 2 is ready to receive the two outputs of Epoch 1. One DMA out operation stores the output of the convolution operation, Convolution 1, for example, by using DMA 1 1186 to store the results in a system memory (see global memory 302 of FIG. 3). Another DMA out operation stores the output of the activation/rectification operation, Activation/Rectification 1, for example, by using DMA 2 1186 to store the results in a system memory (see global memory 302 of FIG. 3). One DMA in operation retrieves the stored output of the convolution operation, Convolution 1, for example, by using DMA 3 1186 to retrieve the stored results from the system memory (see global memory 302 of FIG. 3). Another DMA in operation retrieves the stored output of the activation/rectification operation, Activation/Rectification 1, for example, by using DMA 4 1186 to retrieve the stored results from the system memory (see global memory 302 of FIG. 3).

As shown in FIG. 13, inserting a reconfigurable hardware buffer structure (e.g., reconfigurable hardware buffer 1170 of FIG. 11) on a lowest delay edge of the graph, as illustrated on the shortest among the two paths, facilitates avoiding splitting of the computation in two sequential steps, reducing the number of cycles to perform the desired operations and the need for extra memory buffers and accesses to system memory. The graph of FIG. 12 consisting of two execution epochs is simplified to just one execution epoch in the graph of FIG. 13, illustrating the potential impact of using a buffer, such as a reconfigurable hardware buffer, to break a deadlock cycle. The concept may be generalized to generic cases where there are more than two graph edges by using a plurality of buffer channels of the reconfigurable hardware buffer and managing the data transfers.

Even for operations different from convolutions, partial data resulting from intermediate computations cannot be always passed on to the following stages, if those stages are not yet ready to process the partial data. Such dataflows may generate deadlocks, starvation and, in general, concurrency errors.

Figure 14:
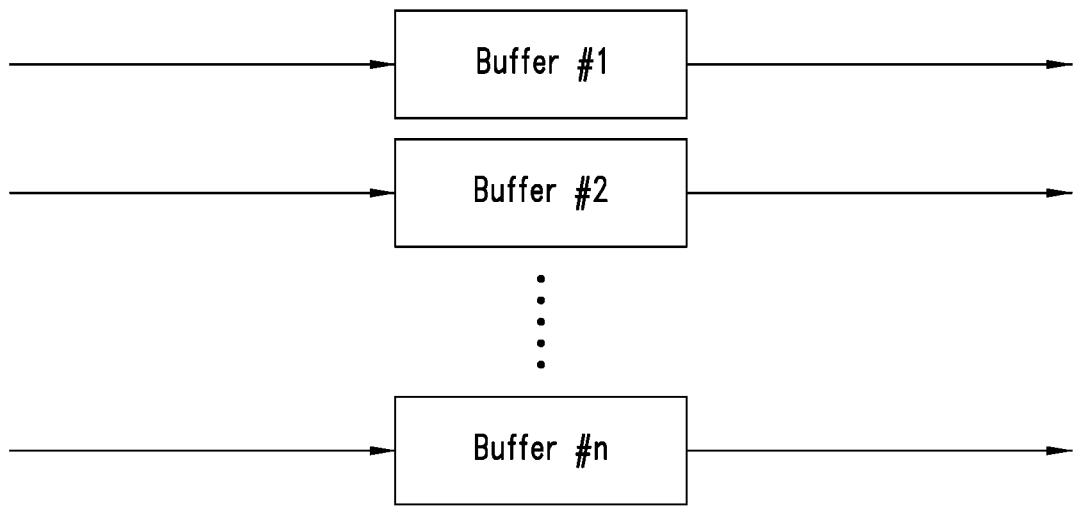
FIG. 14 is a conceptual diagram for illustrating an example set of buffers to store partial data output from earlier processes of a data stream for use in later processes.

Such errors may be addressed using scheduling approaches together with a number of small buffering structures storing the partial data coming out from earlier processes or circuits in the dataflow and outputting the partial data to later processes or circuits when the processes are ready for the data. In fact, along a single execution epoch different processes or circuits may take advantage of having a dedicated buffer. Thus, different buffers for the different processes or circuits may be employed to store, reorganize and read the data to be used by subsequent processes or circuits. FIG. 14 conceptually illustrates an example set of buffers, buffers 1 to n, which may be employed in a convolutional accelerator framework to store partial data output from earlier processes or circuits of a data stream for use in later processes or circuits.

Figure 15:
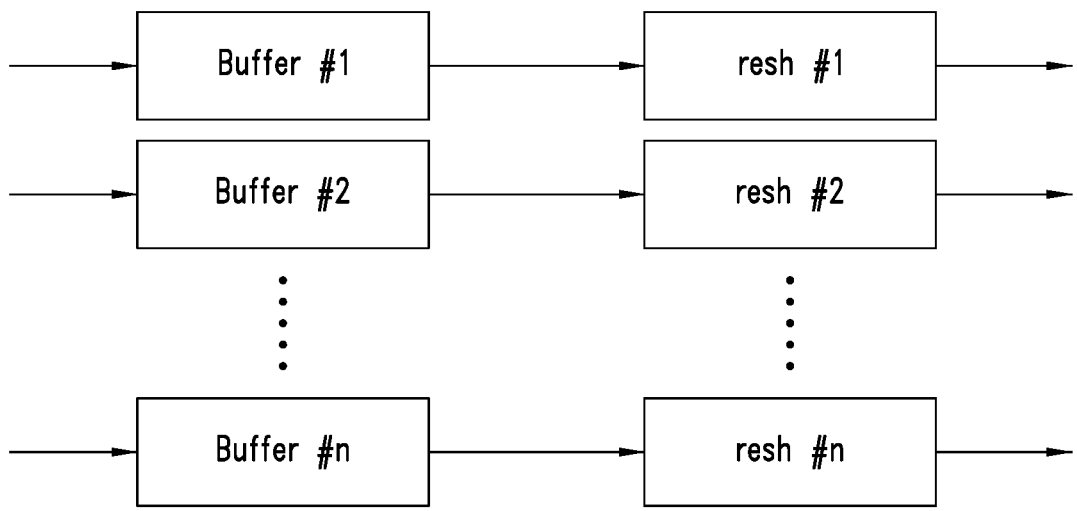
FIG. 15 is a conceptual diagram for illustrating an example set of buffers to store partial data output from earlier operations of a data stream and corresponding reshaping circuits to reshape the data for use in later operations.

As discussed above, in some cases a reorganization or reshaping of the data may be employed before partial data output by an operation is processed by subsequent operation. For example, when a subsequent operation performs a dilated convolution of the output data of a prior operation, the output data is reshaped, e.g., subsampled. FIG. 15 conceptually illustrates an example set of buffers, buffers 1 to n, to store partial data output from earlier operations of a data stream and corresponding reshaping circuits, reshaping circuits 1 to n, to reshape the data for use in later operations. In an embodiment, the reshaping circuits may be implemented using buffer memory storing the partial output data, and controlling the reading out of the data from the buffer memory to reshape the data.

The data organization and operation scheduling in CNN architectures are employed to facilitate the correctness of the execution, as well as to control the timing performance and closure of the execution. In a CNN, several structures typically process the data in small data tiles or data blocks along a channel dimension, even subdividing these operations in smaller ones in order to obtain data batches of suitable dimensions capable of accelerating the overall performances of the HW accelerator framework. An incorrect scheduling may result in the creation of concurrency errors in the execution, causing errors in the resulting outputs, or even a stall of the dataflow chain with possible starvation issues.

In particular, in the case of data stream oriented architectures, several operations may need to be taken into account in scheduling and processing (e.g. chaining, forks, stall propagation, etc.). Deadlocks and starvation issues often arise from loops in the processing, and when there is not sufficient buffering space, may cause an operation to hang.

Circuits using iteration loops to carry out processing, subdividing the dataflow channel wise, splitting operations in smaller chunks and later joining partial data (e.g., a convolution accelerator circuit), are typical examples of structures which could benefit by exploiting reconfigurable hardware buffers of an convolutional accelerator framework during processing.

As noted above, these issues may be addressed in software by scheduling the operations to be performed. Usually the considered architectures follow a monolithic approach, and hence the buffer dimensions and management are a priori decided and the flexibility of the architecture may be sacrificed in favor of an easier scheduling strategy. However, the inventors have realized that for a monolithic architecture, a reconfigurable buffering structure may be employed to address dataflow timing concerns in the case of a modular approach, due to the flexibility of the modular structure. A reconfigurable buffering structure also may be configured to reshape data for use, for example, in dilated convolutions, which often present difficult scheduling issues for software solutions.

In particular, finding a software solution using a scheduler and fixed buffer dimensions is not always a trivial task and identifying such solutions often requires significant time and computing resources. Moreover, if the sequence of operations need to be split in different execution epochs this may result in longer execution times and in an increased number of external memory accesses, even in the absence of occurrences of concurrency issues.

A hardware structure capable of easing these issues, such as a reconfigurable hardware buffer, may facilitate improved data organization, shorter execution times, a lower number of external memory accesses, easier reshaping of data, etc., while also simplifying scheduling design, and reducing time and resources employed to perform the scheduling design.

The reconfigurable hardware buffer may be a HW architecture configured to receive one or more data streams, reorganize the data into suitable forms, and providing the data as outputs of the buffer with the original format or after reshaping operations.

The reshaping operations could be performed to adapt the connection between two components of a convolutional accelerator framework considering different numbers of active streaming channels, to change the shape of the input data to adapt it for a different computation and to optionally organize the data in order to provide a feasible stream for a subsequent operation, such as a dilated convolution operation. Otherwise a mirroring operation mode may be used to reproduce the input on the output without changing a shape of the data.

In an embodiment, up to 8 circuits (e.g., convolutional accelerators, pooling circuits, activation circuits, etc.) may be coupled to the reconfigurable buffer (e.g., via a streaming switch), which may have a read/write priority from the first to the last connection. For example, up to 4 circuits may be coupled to inputs of the reconfigurable hardware buffer and up to 4 circuits may be coupled to outputs of the reconfigurable hardware buffer. A circuit may be coupled to both an input and an output of the reconfigurable hardware buffer. In this way, for example, if different buffered streams are ready at the same time, the one associated to the highest priority (lowest index) will be read first. A memory module or circuit used as a multiple FIFO structure may be employed used to store the data waiting to be read, while a system of counters and logic may be employed to reproduce the input or conveniently reshape it.

Figure 16:
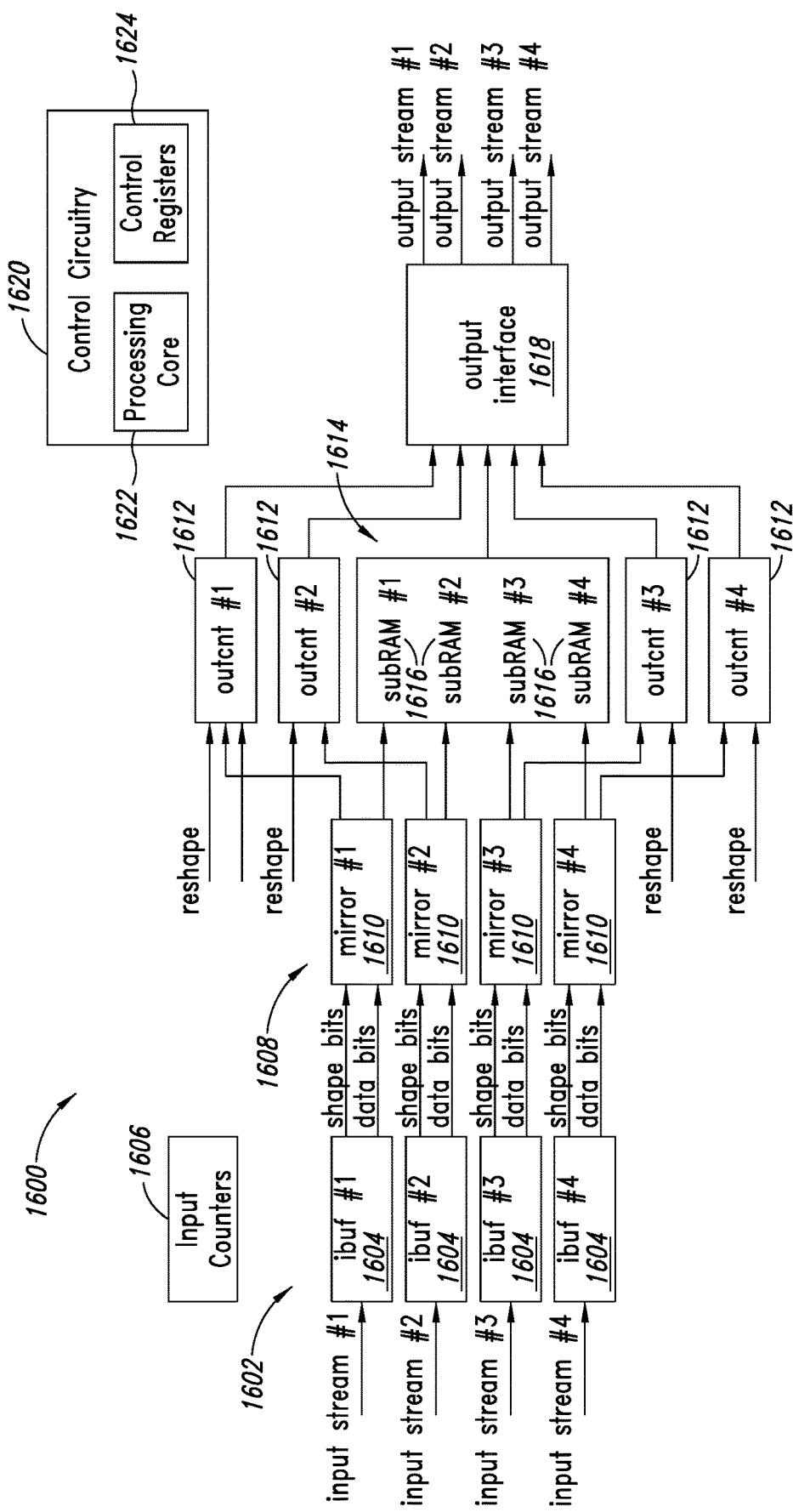
FIG. 16 is a functional block diagram of an embodiment of a reconfigurable hardware buffer which may be employed in a hardware accelerator framework.

FIG. 16 illustrates an embodiment of a reconfigurable hardware buffer unit or circuit 1600 which may be employed in a convolutional accelerator framework, such as the accelerator framework 1100 of FIG. 11. The accelerator framework 1100 may itself be employed in a system as a CNN accelerator, such as the CNN accelerator 240 of FIG. 2.

As illustrated, the reconfigurable hardware buffer 1600 comprises a buffer 1602 reconfigurable organized as a plurality of input buffers 1604, input counters 1606, a mirror buffer 1608, reconfigurably organized to store one or more data streams 1610, output counting circuitry illustrated as a plurality of output counters 1612, output RAM 1614, reconfigurably organized into one or more subRAMs 1616, an output interface 1618, and control circuitry 1620. The mirror buffer 1608 may be implemented using a set of one or more support buffers. As illustrated, the control circuitry 1620 includes a processing core 1622 and control registers 1624 to store control information (e.g., information to configure the buffer 1602, the mirror buffer 1608, and the RAM based, for example, on scheduling information associated with an execution epoch). For convenience, an example of the operation of the reconfigurable hardware buffer 1600 of FIG. 16 will be described with reference to the accelerator framework 1100 of FIG. 11.

The input buffers 1604 receive one or more input data streams of one or more data channels, for example from outputs of other components of the accelerator framework 1100, such as from an output of a convolutional accelerator 1192, via stream switch 1180. The input counters or registers 1606 may be employed to keep track of a number of incoming samples and an input data format (e.g., for use in a mirroring operational mode). In an embodiment, the input buffers 1604 and the input counters 1606 may be combined into an input interface, which also may receive control information, such as configuration and timing information associated with an execution epoch.

Resources of the reconfigurable hardware buffer 1600 may be allocated to a data channel of an operation for which data is to be stored for use by a subsequent operation. Data of a data channel is stored in an input buffer 1604 of a determined size allocated to the data channel of the operation. The data is transferred from the input buffer into the mirror buffer 1608, and may subsequently be transferred into a sub RAMs 1616 of RAM 1614 of a determined size allocated to the data channel. One or more input counters 1606 and one or more output counters 1612 may also be allocated to the data channel. It is noted that some of the determined sizes may be fixed, and other determined sizes may vary. For example, a size of the input buffers may be fixed, while a word size of the mirror buffer and a size of the subRAM (e.g., a width of the subRAM), may vary.

Counts stored in the output counters 1612 and shaping information may be employed by output interface 1618 to control output of data from mirror buffer or the subRAMs 1614 or both via the interface 1618. The interface 1618 may be controlled, for example, to provide, at appropriate timing, a mirror output or to perform dilation of the data for use by a subsequent operation, for example, in the case of dilation being performed, a subsequent atrous convolution operation. The counters 1606, 1612 may be dimensioned according to a largest frame dimension to be considered. For example, 32 bit counters may be employed, e.g., for a raw frame having $2^{32}$ samples, or $2^{16} \times 2^{16}$ for a raster scan frame.

In an embodiment, the reconfigurable hardware buffer may be configured to have up to 4 input streams or data channels, up to 4 output streams or data channels, and may include a memory of 96×256 bits and 32 bit counters.

An example mirror operation in which the output provided by the reconfigurable hardware buffer mirrors the input will be described with reference to FIGS. 16-20.

Figure 17:
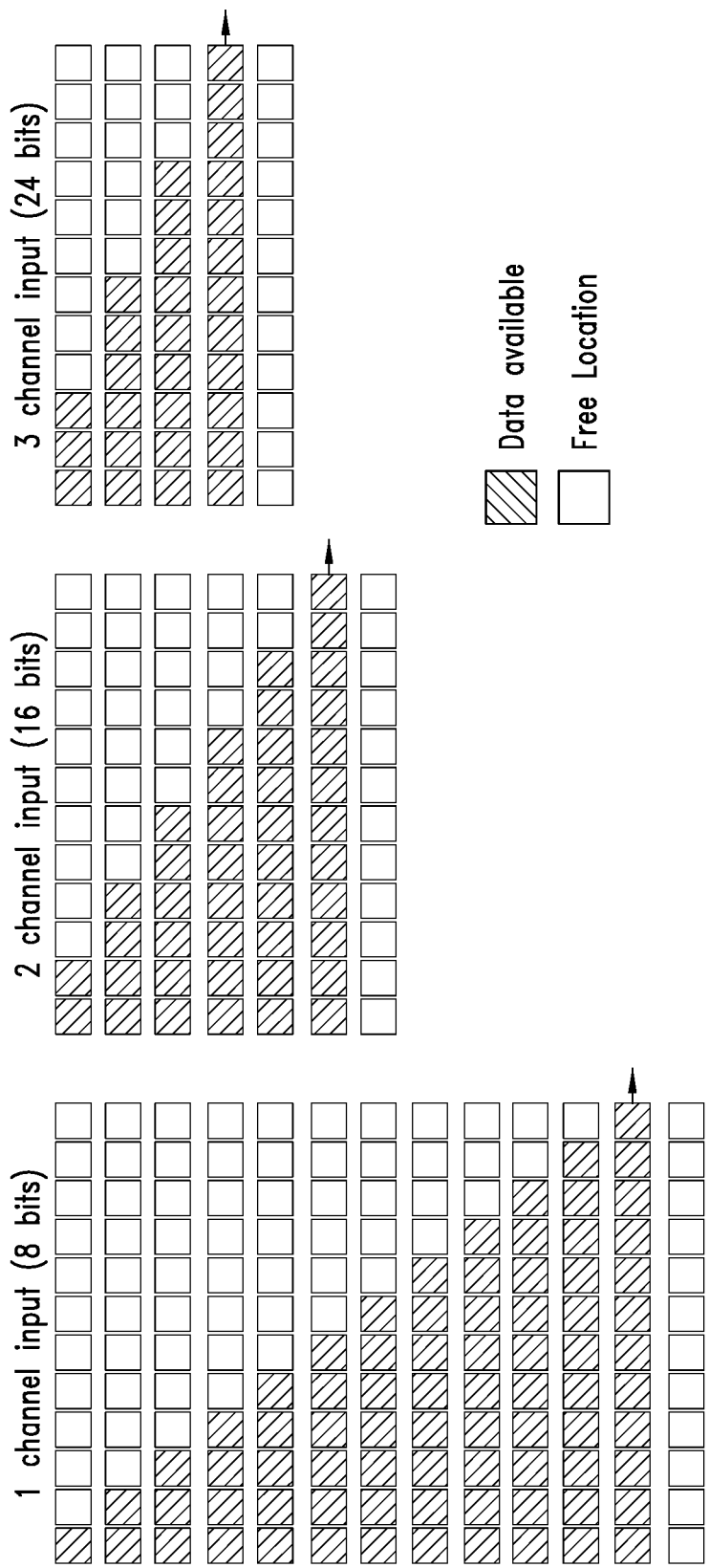
FIG. 17 is a conceptual diagram for illustrating examples of determining a word size of a mirror buffer of a reconfigurable hardware buffer during a data execution epoch.

FIG. 17 is a conceptual diagram for illustrating examples of how the mirror buffer 1608 stores data of a data channel according to the dimensions of the data channel associated with an operation. Assuming the memory word size is 12 bytes, the mirror buffer adapts the input data before writing the data in the memory. As illustrated, the reconfigurable hardware buffer 1600 may be configured to store data for a single channel input, corresponding to 8 data bits; the reconfigurable hardware buffer 1600 may be configured to store data for two input channels, corresponding to 16 data bits; and the reconfigurable hardware buffer 1600 may be configured to store data for three input channels, corresponding to 24 data bits. If a frame ends before completing the writing of a vector (e.g., a 96 bit vector), any remaining bits in a word may be padded with zero values. The arrows in FIG. 17 indicate the transfer of a single word from the mirror buffer to the subRAM allocated to the channel.

Figure 18:
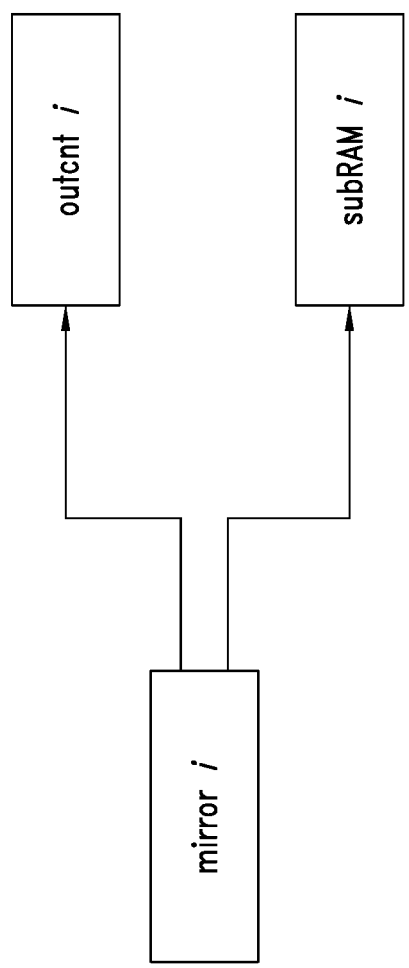
FIG. 18 is a conceptual diagram for illustrating data in a mirror buffer, and an output counter and a subRAM allocated to a data channel associated with an operation.

FIG. 18 is a conceptual diagram for illustrating data stored in a mirror buffer, mirror i, and an output counter, outcnt i, and a subRAM, subRAM allocated to a data channel associated with an operation. When valid data associated with an operation is read from the mirror buffer, an output counter associated with the mirror buffer is incremented by 1 to take into account the new data. The output counter may be incremented even when the data is not transferred to the subRAM associated with the data channel from the mirror buffer.

The reconfigurable hardware buffer 1600 may take into account a line type of the incoming data associated with the mirror operation. For example, an output counter 1612 having 32 bits may use all of the bits as a single counter in the case of a raw data line type. When new data from the input buffer associated with the channel is stored in the mirror buffer associated with the channel, the value of the counter is incremented, as shown below:

$$\text{Counter Value} = a_{31}a_{30}a_{29} \ldots a_2a_1a_0 + 1$$

In the case of raster or single raster data line type, 16 bits of the register may be used to track the incoming columns, and 16 bits of the register may be used to track the incoming rows. When new data from the input buffer associated with the channel is stored in the mirror buffer associated with the channel prior to the end of an input line, the value of the counter is incremented, as shown below:

$$\text{Counter Value} = r_{15}r_{14}r_{13} \ldots r_2r_1r_0c_{15}c_{14}c_{13} \ldots c_2c_1c_0 + 1$$

When new data from the input buffer associated with the channel is stored in the mirror buffer associated with the channel and an input line ends, the value of the counter is incremented, as shown below:

$$\text{Counter Value} = r_{15}r_{14}r_{13} \ldots r_2r_1r_0c_{15}c_{14}c_{13} \ldots c_2c_1c_0 + 2^{16}$$

Figure 19:
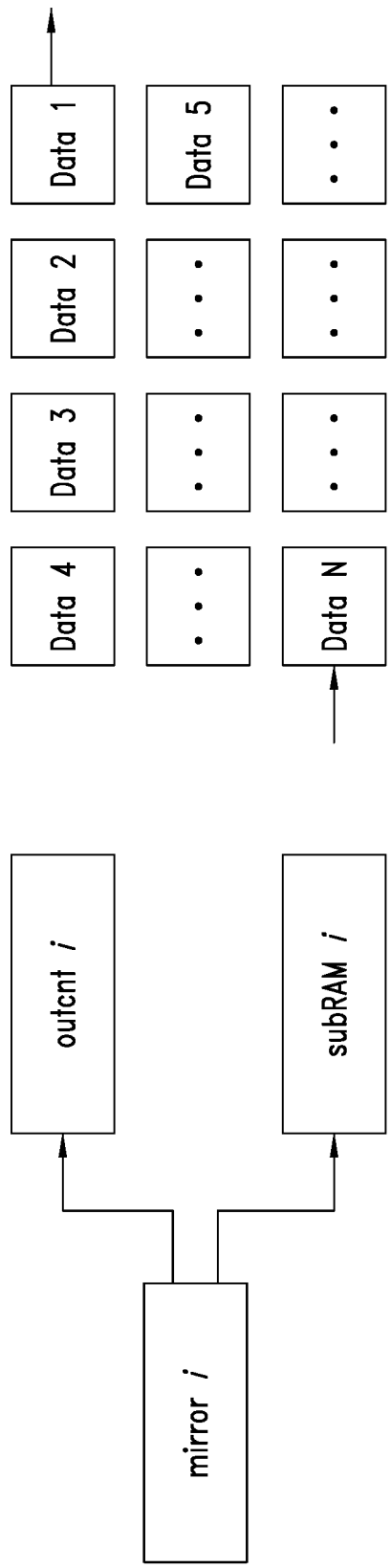
FIG. 19 is a conceptual diagram for illustrating an embodiment of a subRAM in a logical form of a first-in-first-out (FIFO) buffer.

FIG. 19 is a conceptual diagram for illustrating an embodiment of a subRAM in a logical form of a first-in-first-out (FIFO) buffer, which facilitates generating an appropriate output based on counter and shaping information.

Figure 20:
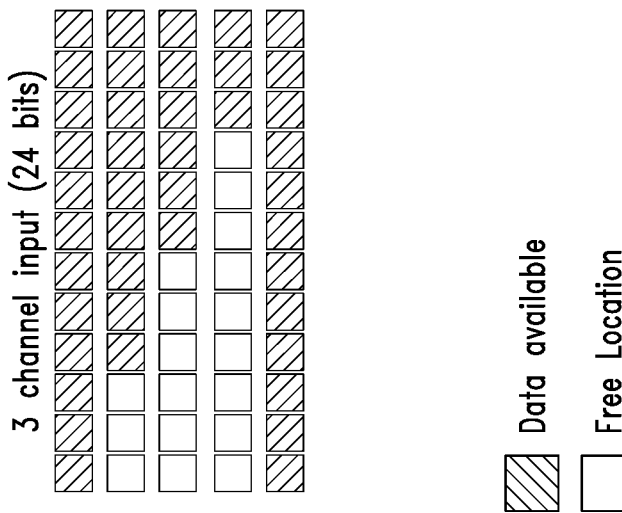
FIG. 20 is a conceptual diagram for illustrating examples of determining a size of an output subRAM to allocate to a data output channel associated with a subsequent operation.
Figure 20:
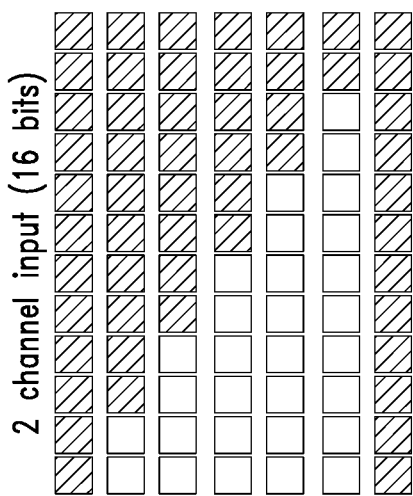
Figure 20:
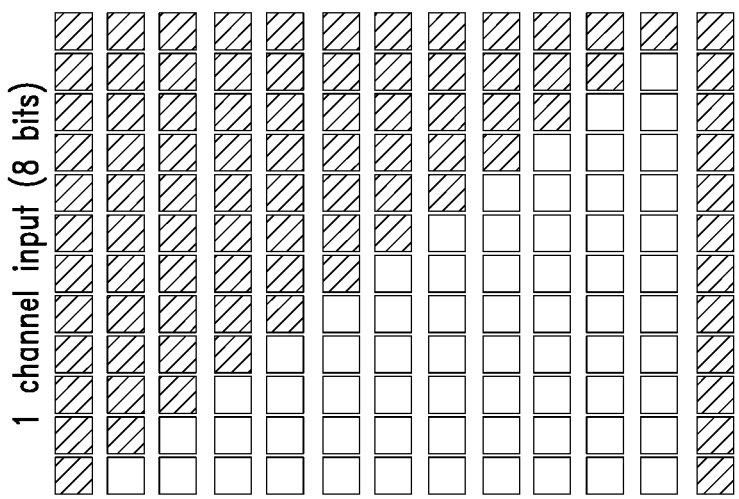

FIG. 20 is a conceptual diagram for illustrating examples of writing to and reading data of an output interface providing data of an output channel associated with a subsequent operation, assuming a word size of twelve bytes. The examples of FIG. 20 may be employed, for example, when the data output channel is a mirrored output of an input channel. As illustrated, when the reconfigurable hardware buffer 1600 is configured to output data for a single channel, corresponding to 8 data bits, an output subRAM having a first size may be allocated to the channel; when the reconfigurable hardware buffer 1600 is configured to output data for two input channels, corresponding to 16 data bits may be allocated to the channel; when the reconfigurable hardware buffer 1600 is configured to output data for three input channels, corresponding to 24 data bits may be allocated to the channel.

It is noted that more than one output channel associated with one or more subsequent operations may be allocated to an input operation, for example, when one subsequent operation will employ mirrored data and another subsequent operation will employ dilated data from the operation for which the data is being stored.

Figure 21:
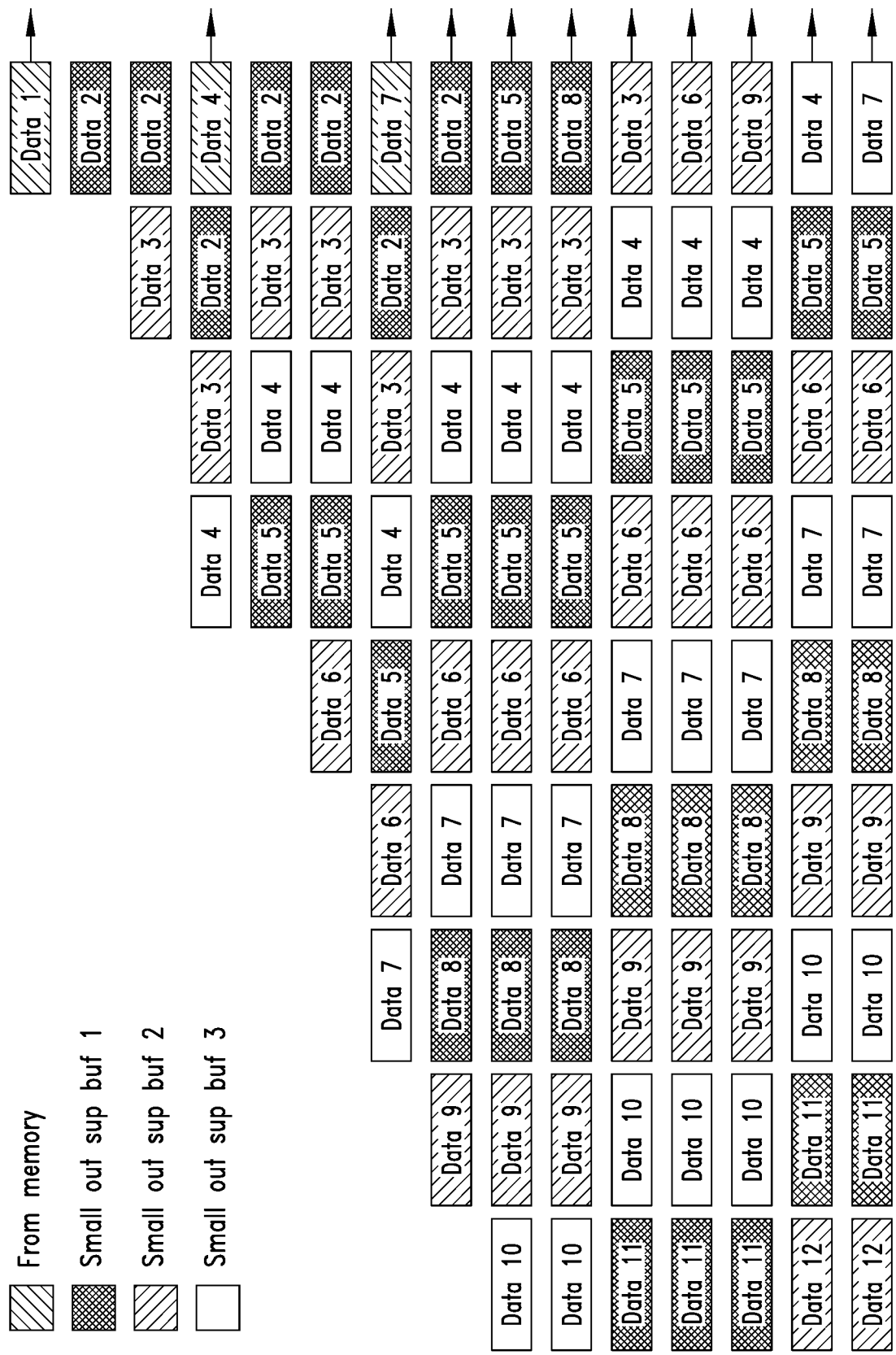
FIG. 21 is a conceptual diagram for illustrating examples of reorganizing data stored in the mirror buffer and one or more output subRAMs to provide a shaped output, such as an output to which a dilation factor has been applied.

FIG. 21 is a conceptual diagram for illustrating examples of reorganizing data stored in the mirror buffer and one or more output subRAMs to provide a shaped output, such as an output to which a dilation factor has been applied. Such an output may be provided to, for example, a convolutional accelerator circuit 1192 performing a dilated convolution operation. The dilation factor, d, may be employed to reorganize the data coming out from the mirror and subRAM buffering structures in order to obtain an output stream fit to the particular application simply by taking the right data coming out from the structure and ignoring the other data which does not need to be involved in the convolution operation. For the example illustrated in FIG. 21, the dilation factor is 2.

Figure 22:
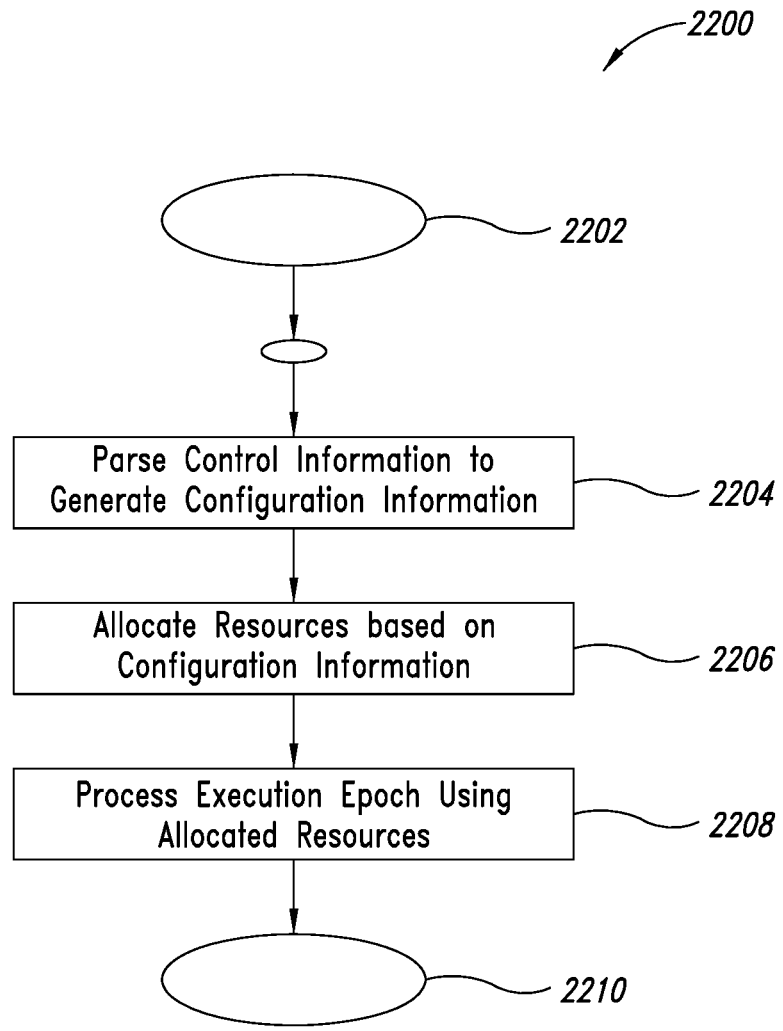
FIG. 22 illustrates an embodiment of a method of processing an execution epoch of a CNN using a convolutional accelerator framework having a reconfigurable hardware buffer.

FIG. 22 illustrates an embodiment of a method 2200 of processing an execution epoch of a CNN using a convolutional accelerator framework having a reconfigurable hardware buffer, embodiments of which may be employed, for example, by the system 200 of FIG. 2 or the system 300 of FIG. 3. The method 2200 of FIG. 22 will be described for convenience with reference to the convolutional accelerator framework 1100 of FIG. 11 and the reconfigurable hardware buffer 1600 of FIG. 16.

The method 2200 starts at 2202. The method 2200 may be started, for example, in response to a request to process an execution epoch of a CNN received from a host system (see host system 304 of FIG. 3). The method 2200 proceeds from 2202 to 2204.

At 2204, the method 2200 parses control information associated with an execution epoch to generate configuration information to allocate resources of the convolutional accelerator framework 1100 to the execution epoch, including allocating resources of the reconfigurable hardware buffer 1170 to data channels of the execution epoch. The configuration information may comprise a dataflow chain in which various operations of the dataflow chain are assigned to various components of the convolutional accelerator framework 1100, such as to one or more convolutional accelerators 1192 or other functional circuits 1190, configuration information to configure the stream switch 1180 to route data streams or channels of the dataflow chain between the various components performing the various operations and the reconfigurable hardware buffer, and configuration information to allocate resources of the reconfigurable hardware buffer 1170, 1600, to data streams or channels to temporarily buffer or store data output by an operation of the dataflow chain for subsequent use by an operation of the dataflow chain, as well as any reshaping information for a data stream or channel. The method 2200 proceeds from 2204 to 2206.

At 2206, the method 2200 allocates resource of the convolutional accelerator framework 1100 to the execution epoch based on the configuration information. With respect to the reconfigurable hardware buffer 1170, 1600, the configuration information may include a number of input channels, for each of one or more input data channels, a buffer index associated with the input data channel, a size of an input buffer 1604 allocated to the input data channel, a word size of the mirror buffer, a size of RAM (e.g., a number of subRAMs 1614) allocated to the input data channel, one or more output data channels associated with the input data channel, and any reshaping and information associated with the output data channels. The size information may be based, for example, on a number of data channels of the dataflow chain to be temporality stored by the reconfigurable hardware buffer 1170, 1600 during processing of the execution epoch, for example as discussed above with respect to FIGS. 16 to 21. Default and fixed sizes may be employed. For example, the input buffers allocated to data channels may have a fixed size in some embodiments. The method 2200 proceeds from 2206 to 2208.

At 2208, the method 2200 processes the execution epoch using the allocated resources. For example, with reference to FIGS. 11, 13 and 16, a convolutional accelerator 1192 of an accelerator framework 1100 may perform a convolution on input data, the results of the convolution may be provided to an activation circuit 1190 and stored in a reconfigurable hardware buffer 1170, with the stored results and the output of the activation circuit provided to an addition circuit 1190 of the accelerator framework 1100. The method 2200 proceeds from 2208 to 2210.

At 2210, the method 2200 optionally performs other processing, such returning results of the execution epoch to a requesting host, other processing associated with the execution epoch, processing to indicate the accelerator framework 1100 may process another execution epoch, etc.

Embodiments of methods of processing an execution epoch using a convolutional accelerator framework having a reconfigurable hardware buffer may contain additional acts not shown in FIG. 22, may not contain all of the acts shown in FIG. 22, may perform acts shown in FIG. 22 in various orders, and may be modified in various respects. For example, the method 2200 may omit act 2204 when configuration information does not need to be parsed from control information. In another example, the method 2200 may be modified to process multiple epochs using the same configuration information, such as for an iterative process, or modified to store an output of one epoch in the reconfigurable hardware buffer for use in a subsequent epoch.

Some embodiments may take the form of or comprise computer program products. For example, according to one embodiment there is provided a computer readable medium comprising a computer program adapted to cause one or more processing devices to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise," and variations thereof, such as "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A convolutional accelerator framework (CAF), comprising:
   a plurality of processing circuits including one or more convolution accelerators;
   a reconfigurable hardware buffer configurable to store data of a variable number of input data channels, the reconfigurable hardware buffer having:
      a memory including an input buffer memory, a mirror buffer and a random access memory (RAM); and
      control circuitry; and
   a stream switch coupled to the plurality of processing circuits and to the reconfigurable hardware buffer, wherein, in operation,
   a number of the variable number of input data channels is associated with an execution epoch;
   the stream switch streams data of the variable number of input data channels between processing circuits of the plurality of processing circuits and the reconfigurable hardware buffer during processing of the execution epoch;
   the control circuity of the reconfigurable hardware buffer configures the memory to store data of the variable number of input data channels during processing of the execution epoch, the configuring including allocating a portion of the memory to each of the variable number of input data channels; and
   the allocating a portion of the memory to an input data channel of the variable number of input data channels includes determining an input buffer of the input buffer memory to allocate to the input data channel, and determining a size of subRAM of the RAM to allocate to the input data channel.

2. The convolutional accelerator framework of claim 1, wherein the allocating a portion of the memory to the input data channel comprises determining a word size of the mirror buffer.

3. The convolutional accelerator framework of claim 2, wherein the word size of a mirror buffer is a function of the variable number of input data channels stored in the reconfigurable hardware buffer during processing of the execution epoch.

4. The convolutional accelerator framework of claim 2, wherein, in operation, the subRAM is configured as a first-in-first-out memory.

5. The convolutional accelerator framework of claim 1, wherein the control circuitry of the reconfigurable hardware buffer, in operation, reconfigures the memory between processing of a first execution epoch and processing of a second execution epoch.

6. The convolutional accelerator framework of claim 1, wherein the variable number is an element of the set of numbers {0, 1, 2, 3, 4}.

7. The convolutional accelerator framework of claim 1, wherein the reconfigurable hardware buffer comprises an output interface, and the control circuitry, in operation, configures the output interface to provide a variable number of output data channels.

8. The convolutional accelerator framework of claim 7, wherein, in operation, the variable number of input data channels is equal to the variable number of output data channels.

9. The convolutional accelerator framework of claim 7, wherein, in operation, the variable number of input data channels is less than the variable number of output data channels.

10. A convolutional accelerator framework (CAF), comprising:
   a plurality of processing circuits including one or more convolution accelerators;
   a reconfigurable hardware buffer configurable to store data of a variable number of input data channels, the reconfigurable hardware buffer having:
      a memory; and
      control circuitry; and
   a stream switch coupled to the plurality of processing circuits and to the reconfigurable hardware buffer, wherein, in operation,
   a number of the variable number of input data channels is associated with an execution epoch;
   the stream switch streams data of the variable number of input data channels between processing circuits of the plurality of processing circuits and the reconfigurable hardware buffer during processing of the execution epoch;
   the control circuity of the reconfigurable hardware buffer configures the memory to store data of the variable number of input data channels during processing of the execution epoch, the configuring including allocating a portion of the memory to each of the variable number of input data channels;
   the reconfigurable hardware buffer comprises an output interface, and the control circuitry, in operation, configures the output interface to provide a variable number of output data channels; and
   configuring the output interface to provide an output data channel of the variable number of output data channels comprises providing a mirrored output of an input data channel of the variable number of input data channels.

11. The convolutional accelerator framework of claim 10, wherein the memory comprises an input buffer memory, a mirror buffer and a random access memory (RAM), and the allocating a portion of the memory to an input data channel of the variable number of input data channels includes determining an input buffer of the input buffer memory to allocate to the input data channel, and determining a size of subRAM of the RAM to allocate to the input data channel.

12. A convolutional accelerator framework (CAF), comprising:
   a plurality of processing circuits including one or more convolution accelerators;
   a reconfigurable hardware buffer configurable to store data of a variable number of input data channels, the reconfigurable hardware buffer having:
      a memory; and
      control circuitry; and a stream switch coupled to the plurality of processing circuits and to the reconfigurable hardware buffer, wherein, in operation, a number of the variable number of input data channels is associated with an execution epoch;

the stream switch streams data of the variable number of input data channels between processing circuits of the plurality of processing circuits and the reconfigurable hardware buffer during processing of the execution epoch;

the control circuity of the reconfigurable hardware buffer configures the memory to store data of the variable number of input data channels during processing of the execution epoch, the configuring including allocating a portion of the memory to each of the variable number of input data channels;

the reconfigurable hardware buffer comprises an output interface, and the control circuitry, in operation, configures the output interface to provide a variable number of output data channels; and configuring the output interface to provide an output data channel of the variable number of output data channels comprises providing a reshaped output of an input data channel of the variable number of input data channels.

13. The convolutional accelerator framework of claim 12, wherein, in operation, the reshaped output is provided, via the stream switch, as an input to a convolutional accelerator of the one or more convolutional accelerators, wherein the convolutional accelerator, in operation, performs a dilated convolution operation of the execution epoch using the reshaped output.

14. A convolutional accelerator framework (CAF), comprising:
 a plurality of processing circuits including one or more convolution accelerators;
 a reconfigurable hardware buffer configurable to store data of a variable number of input data channels, the reconfigurable hardware buffer having:
  a memory; and
  control circuitry; and
 a stream switch coupled to the plurality of processing circuits and to the reconfigurable hardware buffer, wherein, in operation,
 a number of the variable number of input data channels is associated with an execution epoch;
 the stream switch streams data of the variable number of input data channels between processing circuits of the plurality of processing circuits and the reconfigurable hardware buffer during processing of the execution epoch;
 the control circuity of the reconfigurable hardware buffer configures the memory to store data of the variable number of input data channels during processing of the execution epoch, the configuring including allocating a portion of the memory to each of the variable number of input data channels;
 the reconfigurable hardware buffer comprises an output interface, and the control circuitry, in operation, configures the output interface to provide a variable number of output data channels; and
 the control circuitry comprises a number of counters and control logic, and, in operation, the control logic uses the counters to track storage of data of the variable number of input data channels in the memory and to control providing of stored data to the variable number of output data channels.

15. A system to implement a neural network (NN), the system comprising:
 a host processor;
 a main memory; and
 an accelerator framework (AF), the accelerator framework including:
  a plurality of processing circuits including one or more accelerators;
  a reconfigurable hardware buffer configurable to store data of a variable number of input data channels, the reconfigurable hardware buffer having:
   a memory including an input buffer memory, a mirror buffer and a random access memory (RAM); and
   control circuitry; and
  a stream switch coupled to the plurality of processing circuits and to the reconfigurable hardware buffer, wherein, in operation,
 a number of the variable number of input data channels is associated with an execution epoch of the NN;
 the stream switch streams data of the variable number of input data channels between processing circuits of the plurality of processing circuits and the reconfigurable hardware buffer during processing of the execution epoch;
 the control circuity of the reconfigurable hardware buffer configures the memory of the reconfigurable hardware buffer to store data of the variable number of input data channels during processing of the execution epoch, the configuring including allocating a portion of the memory of the reconfigurable hardware buffer to each of the variable number of input data channels; and
 the allocating a portion of the memory of the reconfigurable hardware buffer to an input data channel of the variable number of input data channels includes determining an input buffer of the input buffer memory to allocate to the input data channel, determining a word size of the mirror buffer and determining a size of subRAM of the RAM to allocate to the input data channel.

16. The system of claim 15, wherein the size of a mirror buffer is a function of the variable number of input data channels stored in the reconfigurable hardware buffer during processing of the execution epoch.

17. The system of claim 15, wherein the reconfigurable hardware buffer comprises an output interface, and the control circuitry, in operation, configures the output interface to provide a variable number of output data channels.

18. The system of claim 15, comprising an integrated circuit including the host processor, the main memory and the accelerator framework.

19. A system to implement a neural network (NN), the system comprising:
 a host processor;
 a main memory; and
 an accelerator framework (AF), the accelerator framework including:
  a plurality of processing circuits including one or more accelerators;
  a reconfigurable hardware buffer configurable to store data of a variable number of input data channels, the reconfigurable hardware buffer having:
   a memory; and
   control circuitry; and
  a stream switch coupled to the plurality of processing circuits and to the reconfigurable hardware buffer, wherein, in operation, a number of the variable number of input data channels is associated with an execution epoch of the NN;

the stream switch streams data of the variable number of input data channels between processing circuits of the plurality of processing circuits and the reconfigurable hardware buffer during processing of the execution epoch;

the control circuity of the reconfigurable hardware buffer configures the memory of the reconfigurable hardware buffer to store data of the variable number of input data channels during processing of the execution epoch, the configuring including allocating a portion of the memory of the reconfigurable hardware buffer to each of the variable number of input data channels; and the reconfigurable hardware buffer comprises an output interface, and the control circuitry, in operation, configures the output interface to provide a variable number of output data channels, the configuring the output interface to provide an output data channel of the variable number of output data channels comprises providing a reshaped output of an input data channel of the variable number of input data channels.

20. The system of claim 19, wherein the memory of the reconfigurable hardware buffer comprises an input buffer memory, a mirror buffer and a random access memory (RAM), and the allocating a portion of the memory of the reconfigurable hardware buffer to an input data channel of the variable number of input data channels includes determining an input buffer of the input buffer memory to allocate to the input data channel, determining a word size of the mirror buffer and determining a size of subRAM of the RAM to allocate to the input data channel.

21. A method, comprising:
processing an execution epoch of a convolutional neural network using a convolutional accelerator framework having a plurality of processing circuits, a stream switch and a reconfigurable hardware buffer, the processing of the execution epoch including:
configuring a variable number of input data channels of the reconfigurable hardware buffer of the convolutional accelerator framework, a number of the variable number of input data channels being associated with the execution epoch, the configuring including allocating portions of a memory of the reconfigurable hardware buffer to each of the variable number of input data channels;
streaming, via the stream switch, data of the variable number of input data channels between processing circuits of the plurality of processing circuits and the reconfigurable hardware buffer; and
storing data of the variable number of input data channels in the memory of the reconfigurable hardware buffer based on the allocating of portions of the memory to the variable number of input data channels, wherein
the memory comprises an input buffer memory, a mirror buffer and a random access memory (RAM), and allocating a portion of the memory to an input data channel of the variable number of input data channels includes determining an input buffer of the input buffer memory to allocate to the input data channel, determining a word size of the mirror buffer and determining a size of subRAM of the RAM to allocate to the input data channel.

22. The method of claim 21, comprising reconfiguring the memory of the reconfigurable hardware buffer between processing of a first execution epoch and processing of a second execution epoch.

23. The method of claim 21, wherein the reconfigurable hardware buffer comprises an output interface, and the method comprises configuring the output interface to provide a variable number of output data channels.

24. A method, comprising:
processing an execution epoch of a convolutional neural network using a convolutional accelerator framework having a plurality of processing circuits, a stream switch and a reconfigurable hardware buffer, the processing of the execution epoch including:
configuring a variable number of input data channels of the reconfigurable hardware buffer of the convolutional accelerator framework, a number of the variable number of input data channels being associated with the execution epoch, the configuring including allocating portions of a memory of the reconfigurable hardware buffer to each of the variable number of input data channels;
streaming, via the stream switch, data of the variable number of input data channels between processing circuits of the plurality of processing circuits and the reconfigurable hardware buffer; and
storing data of the variable number of input data channels in the memory of the reconfigurable hardware buffer based on the allocating of portions of the memory to the variable number of input data channels, wherein,
the reconfigurable hardware buffer comprises an output interface, and the method comprises configuring the output interface to provide a variable number of output data channels, and
configuring the output interface to provide an output data channel of the variable number of output data channels comprises providing a reshaped output of an input data channel of the variable number of input data channels.

25. The method of claim 24, wherein the memory comprises an input buffer memory, a mirror buffer and a random access memory (RAM), and allocating a portion of the memory to an input data channel of the variable number of input data channels includes determining an input buffer of the input buffer memory to allocate to the input data channel, determining a word size of the mirror buffer and determining a size of subRAM of the RAM to allocate to the input data channel.

26. A method, comprising:
processing an execution epoch of a convolutional neural network using a convolutional accelerator framework having a plurality of processing circuits, a stream switch and a reconfigurable hardware buffer, the processing of the execution epoch including:
configuring a variable number of input data channels of the reconfigurable hardware buffer of the convolutional accelerator framework, a number of the variable number of input data channels being associated with the execution epoch, the configuring including allocating portions of a memory of the reconfigurable hardware buffer to each of the variable number of input data channels;
streaming, via the stream switch, data of the variable number of input data channels between processing circuits of the plurality of processing circuits and the reconfigurable hardware buffer; and
storing data of the variable number of input data channels in the memory of the reconfigurable hardware buffer based on the allocating of portions of the memory to the variable number of input data channels, wherein, the reconfigurable hardware buffer comprises an output interface, and the method comprises configuring the output interface to provide a variable number of output data channels, and the method comprises using counters of the reconfigurable hardware buffer to track storage of data of the variable number of input data channels in the memory and to control providing of stored data to the variable number of output data channels.

27. A non-transitory computer-readable medium having contents that cause one or more hardware processors of a convolutional accelerator framework to perform a method, the method comprising:

processing an execution epoch of a convolutional neural network, the processing of the execution epoch including:

configuring a variable number of input data channels of a reconfigurable hardware buffer of the convolutional accelerator framework, a number of the variable number of input data channels being associated with the execution epoch, the configuring including allocating a portion of a memory of the reconfigurable hardware buffer to each of the variable number of input data channels;

streaming, via a stream switch of the convolutional accelerator framework, data of the variable number of input data channels between processing circuits of a plurality of processing circuits and the reconfigurable hardware buffer; and storing data of the variable number of input data channels in the memory of the reconfigurable hardware buffer based on the allocating of portions of the memory to the variable number of input data channels, wherein, the memory comprises an input buffer memory, a mirror buffer and a random access memory (RAM), and the allocating a portion of the memory to an input data channel of the variable number of input data channels includes determining an input buffer of the input buffer memory to allocate to the input data channel, determining a word size of a mirror buffer and determining a size of subRAM of the RAM to allocate to the input data channel.

28. The non-transitory computer-readable medium of claim 27, wherein the reconfigurable hardware buffer comprises an output interface, and the method comprises configuring the output interface to provide a variable number of output data channels.

29. The non-transitory computer-readable medium of claim 27, wherein the contents comprise instructions executed by the one or more processors of the convolutional accelerator framework.

30. A non-transitory computer-readable medium having contents that cause one or more hardware processors of a convolutional accelerator framework to perform a method, the method comprising:

processing an execution epoch of a convolutional neural network, the processing of the execution epoch including:

configuring a variable number of input data channels of a reconfigurable hardware buffer of the convolutional accelerator framework, a number of the variable number of input data channels being associated with the execution epoch, the configuring including allocating a portion of a memory of the reconfigurable hardware buffer to each of the variable number of input data channels;

streaming, via a stream switch of the convolutional accelerator framework, data of the variable number of input data channels between processing circuits of a plurality of processing circuits and the reconfigurable hardware buffer; and storing data of the variable number of input data channels in the memory of the reconfigurable hardware buffer based on the allocating of portions of the memory to the variable number of input data channels, wherein, the reconfigurable hardware buffer comprises an output interface, and the method comprises configuring the output interface to provide a variable number of output data channels, and configuring the output interface to provide an output data channel of the variable number of output data channels comprises providing a reshaped output of an input data channel of the variable number of input data channels.

31. The non-transitory computer-readable medium of claim 30, wherein the memory comprises an input buffer memory, a mirror buffer and a random access memory (RAM), and the allocating a portion of the memory to an input data channel of the variable number of input data channels includes determining an input buffer of the input buffer memory to allocate to the input data channel, determining a word size of a mirror buffer and determining a size of subRAM of the RAM to allocate to the input data channel.

* * * * *

UNITED STATES PATENT AND TRADEMARK OFFICE
CERTIFICATE OF CORRECTION

PATENT NO. : 12,106,201 B2
APPLICATION NO. : 17/039653
DATED : October 1, 2024
INVENTOR(S) : Carmine Cappetta et al.

Page 1 of 1

It is certified that error appears in the above-identified patent and that said Letters Patent is hereby corrected as shown below:

On the Title Page

<u>Item (71) Applicants:</u>
Should read --STMICROELECTRONICS S.r.l., Agrate Brianza, (IT);
STMicroelectronics International N.V., Geneva (CH)--

Signed and Sealed this
Twenty-sixth Day of November, 2024

Katherine Kelly Vidal
*Director of the United States Patent and Trademark Office*